(12) United States Patent
Seggerman

(10) Patent No.: US 9,915,450 B2
(45) Date of Patent: Mar. 13, 2018

(54) MULTI-SPLIT HEAT PUMP FOR HEATING, COOLING, AND WATER HEATING

(71) Applicant: PAS, Inc., Merrill, IA (US)

(72) Inventor: Karl J. Seggerman, Kingsley, IA (US)

(73) Assignee: PAS, Inc., Sioux Center, IA (US)

( * ) Notice: Subject to any disclaimer, the term of this patent is extended or adjusted under 35 U.S.C. 154(b) by 503 days.

(21) Appl. No.: 14/384,777

(22) PCT Filed: Mar. 15, 2013

(86) PCT No.: PCT/US2013/031937
§ 371 (c)(1),
(2) Date: Sep. 12, 2014

(87) PCT Pub. No.: WO2013/138695
PCT Pub. Date: Sep. 19, 2013

(65) Prior Publication Data
US 2015/0033779 A1   Feb. 5, 2015

Related U.S. Application Data

(60) Provisional application No. 61/611,354, filed on Mar. 15, 2012.

(51) Int. Cl.
| F25B 30/02 | (2006.01) |
| F25B 41/04 | (2006.01) |
| F25D 17/06 | (2006.01) |
| F25B 13/00 | (2006.01) |
| F24D 11/02 | (2006.01) |
| F24D 19/10 | (2006.01) |

(52) U.S. Cl.
CPC .......... *F25B 30/02* (2013.01); *F24D 11/0214* (2013.01); *F24D 11/0257* (2013.01); *F24D 19/1072* (2013.01); *F25B 13/00* (2013.01); *F25B 41/043* (2013.01); *F25D 17/06* (2013.01); *F25B 2313/002* (2013.01); *F25B 2313/003* (2013.01); *F25B 2313/004* (2013.01); *F25B 2313/02732* (2013.01); *Y02B 10/70* (2013.01); *Y02B 30/126* (2013.01)

(58) Field of Classification Search
CPC ................ F25B 30/02; F25B 2313/004; F25B 2313/003; F25B 41/043; F24D 11/0257; F24D 11/0214; F24D 19/1072; Y02B 30/126; F25D 17/06
See application file for complete search history.

(56) References Cited

U.S. PATENT DOCUMENTS

| 4,209,996 A | * | 7/1980 | Shaw .................. F24D 11/0221 237/2 B |
| 5,465,588 A | * | 11/1995 | McCahill ................ F24D 15/04 165/240 |

(Continued)

*Primary Examiner* — Kun Kai Ma
(74) *Attorney, Agent, or Firm* — Boyle Fredrickson, S.C.

(57) ABSTRACT

A multi-split air or ground source heat pump system designed to provide a residential application with space heating and cooling, along with supplemental hydronic heating and potable water preheating. The supplemental hydronic heating supports applications like radiant floor heating and heating swimming pools. Commercially, the multi-split air or ground source heat pump system expands on this technology to incorporate comfort and/or process heating, cooling, and hydronic heating applications utilizing multiple types of energy sources.

16 Claims, 16 Drawing Sheets

(56) References Cited

U.S. PATENT DOCUMENTS

| | | | | |
|---|---|---|---|---|
| 5,467,812 | A * | 11/1995 | Dean | F24F 5/0017 165/62 |
| 6,212,894 | B1 * | 4/2001 | Brown | F24D 19/1054 236/20 R |
| 6,666,040 | B1 * | 12/2003 | Groenewold | F24F 3/153 62/173 |
| 8,172,157 | B2 * | 5/2012 | Nakagawa | F24D 11/005 237/12.1 |
| 8,800,313 | B2 * | 8/2014 | Woo | F25B 7/00 165/141 |
| 2005/0252226 | A1 * | 11/2005 | Seefeldt | F24D 3/12 62/238.7 |
| 2007/0068187 | A1 * | 3/2007 | Lesage | F25B 25/005 62/335 |
| 2008/0022707 | A1 * | 1/2008 | Cho | F25B 13/00 62/238.1 |
| 2008/0023961 | A1 * | 1/2008 | Cho | F25B 27/02 290/2 |
| 2008/0041072 | A1 * | 2/2008 | Seefeldt | F24D 3/12 62/117 |
| 2008/0092875 | A1 * | 4/2008 | Leifer | F24F 5/0017 126/617 |
| 2008/0098760 | A1 * | 5/2008 | Seefeldt | F25B 1/10 62/238.7 |
| 2008/0276638 | A1 * | 11/2008 | Seefeldt | F25B 1/10 62/238.7 |
| 2010/0018228 | A1 * | 1/2010 | Flammang | F25B 27/02 62/115 |
| 2010/0243202 | A1 * | 9/2010 | Han | F24D 3/18 165/62 |
| 2011/0154844 | A1 * | 6/2011 | Lee | F25B 7/00 62/278 |
| 2012/0292008 | A1 * | 11/2012 | Goldberg | F28D 21/0014 165/287 |
| 2012/0304677 | A1 * | 12/2012 | Fukunaga | F24H 4/04 62/238.7 |
| 2013/0076033 | A1 * | 3/2013 | Zachary | F24D 5/04 290/2 |

* cited by examiner

Air Source Control Diagram    Fig. 10

MULTI-SPLIT HEAT PUMP FOR HEATING, COOLING, AND WATER HEATING

CROSS-REFERENCE TO RELATED APPLICATION(S)

This application claims a benefit of priority under 35 USC § 119 based on Provisional U.S. Patent Application No. 61/611,354, filed Mar. 15, 2012, and also on PCT Application Serial No. PCT/US2013/031937 filed Mar. 15, 2013, both of which the entire contents of are hereby expressly incorporated by reference into the present application.

BACKGROUND OF THE INVENTION

A system described in U.S. Pat. No. 7,040,108 accomplished four modes of operation by integrating four heat exchanger circuits of which two only functioned as evaporators and two only functioned as condensers.

Dynamic transitions generally are a function of switching between two evaporators or switching between two condensers that may be available to a given compressor as accomplished by U.S. Pat. No. 7,040,108. While not common, this would historically be accomplished through use of 2-way, 3-way, or 4-way solenoid/pilot operated valves. When modes were switched, the solenoid would shut one refrigerant path and simultaneously open another. This created undesirable noise and vibrations. It could cause the compressor to experience a sudden spike in pressure which was often followed by a period of low system pressure causing the compressor to experience a brief period of run-away or over-speed.

What is therefore needed is a system that allows an HVAC system to gain the cost and operational efficiencies as well as the flexibility of directly performing four modes of operation. The four modes of operation including, heating, cooling, direct water heating, and cogeneration.

The invention preferably includes multi-split heat pump heat exchangers to eliminate the need for two indoor and two outdoor single mode heat exchangers, as in the prior art, and eliminate the fanless outdoor evaporator of the prior art to provide direct space heating rather than hydronic supported space heating.

Further the configuration of this invention allows quiet smooth transitions over a period of greater than 90 seconds without run-away.

Such a configuration may also overcome the limitations of the of the prior art including a pilot operated solenoid valve and its inability to reliably operate under the pressure conditions of a refrigerant system involving more than 2 heat exchanger circuits and to avoid the harsh transitions associated with the solenoid valves. Such a configuration may allow the system to provide a means to balance the charge between more than 2 differently sized heat exchangers within a single heat pump system and provide a dynamic transition between different modes of operation without executing an off-cycle.

SUMMARY AND OBJECTS OF THE INVENTION

The configuration of one embodiment of the invention diverges from the prior art as the invention may use heat pump heat exchangers which reverse refrigerant flow to be used as both evaporators and condensers. In the prior art, space heating was performed via a hot-water-to-air heat exchanger, unlike the invention which may use a conventional refrigerant heat pump coil.

One embodiment of the invention may use a compressorless heat pump (e.g., System Balancer) for heat rejection during cooling and for heat collection during heating and water heating. An indoor heat pump coil may be used for space heating and indoor cooling. Further, an embodiment of the invention may be configured to use an evaporator with fans and fans, unlike the prior art.

Historically, charge is managed using passive devices like accumulators, charge compensators, or receivers. Excess charge is stored in the passive device under one set of operating conditions and moved into the refrigerant circuit under other conditions. One embodiment of the invention uses an accumulator to compensate for reversing; however, an active charge management system preferably moves refrigerant in and out of the active refrigerant circuit whenever needed (on demand) to avoid over pressure or to optimize superheat and subcooling whenever in water heating or cogeneration modes.

Generally, discharge water temperature is simply allowed to follow the inlet temperature entering the condenser. When the temperature is controlled, some controls reduce the flow rate of the water or attempt to specifically control pump speed or valve opening to achieve the desired outlet temperature; however, this often results in unstable operation as a result of control conflict with the expansion valve. One embodiment of the invention controls the inlet temperature to reduce the instability and uses a spring return valve to avoid circumstances where the system might start up with the mixing valve open to recirculation with the condenser which can cause the unit to shut down due to high pressure within a few seconds.

Generally, heat exchangers are sized for specific operating conditions that stay within a small range. If necessary, mixing valves and dampers and variable speed pumps and fans can be used to accommodate operating conditions that fall outside of the designed range. The operating conditions for water heating mode for this invention may vary over a wide range from −10 F to 105 F for air source and from 23 F to 105 F for the ground source. This requires developing a proprietary fan speed control curve based on testing for the air source model to avoid conflicting with the expansion valve control. The ground source uses a mixing valve setup with spring return in a configuration to control inlet temperature rather than outlet temperature to minimize conflict with the expansion valve control (like the discharge temperature control).

Low temperature cooling may be controlled by slowing or cycling fans or pumps or limiting air or water flow using valves or dampers so as to effectively reduce the heat exchanger surface area. Testing indicated that the ground source unit was less sensitive than the air source unit because of the significant difference in the size of the condensing heat exchanger. For the ground source system, the mixing valve used to maintain discharge temperature for hydronic heating will also be used to limit the temperature of heat rejection when refrigerant pooling becomes an issue. For the air source system, the fan will be slowed down using an algorithm to achieve a setpoint liquid refrigerant return temperature.

Generally, the temperature of the air or liquid entering the condenser is naturally at a temperature that allows the compressor to operate within the recommended operating window of the compressor, and nothing is done to limit the occasional excursion to high compression ratios. However, the invention may be configured to heat water, possibly for an extended period of time, and the temperature of the liquid entering the condenser is desired to be as warm as possible to maximize the ability to perform hydronic heating and potable water preheating. Allowing the system to operate at high compression ratios or pressure conditions outside of the recommended operating window on cold days or when the ground loop is poorly designed and gets too cold could reduce the life of the compressor. Therefore, a setback curve was defined and is imposed on the water temperature setpoint. Also, since discharge and suction pressure are monitored for the system, a cut-out curve has been developed to turn the system off if environmental conditions drive operation to conditions outside of the recommended operating window for any reason. Prior to the invention, commercially available heat pump products lacked any such cut-out function.

The present invention may also relate in general to the field of heat pumps. More particularly, the present invention relates to the balancing and optimization of the operating refrigerant charge across a configuration including three refrigerant heat exchanger circuits within a single vapor compression refrigerant/heat pump system, e.g., Active Charge Management "ACM" system. This ACM system preferably aids in controlling and monitoring the operation of system components to produce four modes of operation (normal space cooling, forced air space heating, water heating, and cogeneration) and transitioning between some modes dynamically to reduce the requirement for off cycles while, limiting negative operational impact on component parts of the overall system.

The fourth mode of operation termed herein as "cogeneration" is where space cooling and water heating occur simultaneously and 100% of the heat rejected by the cooling operation is used to heat water (two functions at the cost of one).

In the inventive system, dynamic transitions are supported between normal space cooling and cogeneration, between cogeneration and water heating, and between forced air space heating and water heating.

Such a system may also be configured to support up to $(N-1)*N$ modes of operation, where N is the number of refrigerant heat exchanger circuits, provided each circuit is operated as both an evaporator and condenser. Six modes of operation with a 3 circuit heat pump $[6=(3-1)*3]$ has not previously been attempted.

For the residential market, this invention integrates the standard functions of air source or ground source heat pump-style equipment with the addition of direct hydronic heating support to supplement potable water, radiant floor, and pool heating at reduced costs, or at little to no additional cost when using co-generation mode. For commercial markets, the invention will also support high efficiency energy reclamation from waste heat streams and process heating and cooling.

Residential consumers will like the appeal of having their home comfort system also providing potable water preheating and radiant floor and pool heating support at reduced cost (or at little to no additional cost while using cogeneration mode) relative to conventional hydronic heating products available on the market. Commercial consumers will like the flexibility of the system to address a number of different heating, cooling, and energy reclamation needs as well as its ability to operate continuously while transitioning between some of the operating modes (dynamic transitions) minimizing off-time and maximizing productivity as conditions change within their facility.

Additional advantages of the invention may include controlling hot water discharge temperatures to support low temperature hydronic heating. Warm heat source control may also allow heat sources (outdoor air, ground loop, or other warm liquid waste stream) that are at temperatures above 60 F while operating in space heating and water heating modes. Cold, ambient space cooling may also be supported. Compression ratio limit control features may be used and include a water heating setpoint setback function and an operating window cutout.

The compressor may be located indoors which may avoid problems inherent with compressors being outdoors in cold climates (i.e., refrigerant migration into the compressor, need for compressor sump heaters, etc.). This limits the refrigerant piping that might otherwise be required to support water heating and increases the effectiveness of water heating by avoiding exposure of the hot refrigerant piping to the cold outdoor temperatures.

The invention also provides means and controls to produce four modes of operation: space heating, space cooling, direct water heating, and cogeneration from an individual heat pump product. Conventional heat pumps produce two functions unless additional products are integrated with them.

The invention may also provide means and controls to allow dynamic transition between modes of operation while the compressor is running (between space cooling and cogeneration, between cogeneration and water heating, between space heating and water heating). Heat pumps require an off-cycle to change modes due to reversing the flow of refrigerant and reversing the pressures in the piping and heat exchangers between heating and cooling mode. This invention may reduce the requirement for off-cycles between space heating or cooling modes and water heating. This is particularly valuable for commercial installations where off-cycles equate to lost productivity.

Another function of the invention is the ability to manage charge imbalance problems (over pressure due to excessive charge, poor subcooling, and superheat) inherent to heat pump systems with more than two heat exchanger circuits when switching between modes either dynamically or after an off-cycle.

The invention may also be configured to support charge optimization over a broad range of operating conditions during water heating and cogeneration where superheat and subcooling would otherwise be allowed to slide uncontrolled due to a fixed charge as operating conditions vary for conventional heat pumps.

Another feature of the invention is the ability to avoid failure of pilot operated (pressure dependent) solenoid valves to properly operate within a heat pump system with more than two heat exchanger circuits under all operational circumstances.

The combination of the controls and how they are applied to work together to control operation for the unique configuration of the three heat exchanger circuit heat pump over the range of environmental conditions the system will experience is also unique. This combination solves a problem that did not previously exist.

The invention may provide control means to maintain operating hot water discharge temperatures at levels necessary to support low temperature hydronic heating support for applications such as pool heating and radiant floor heating. This may occur even when the return or supply water temperature is significantly below the temperature required to provide meaningful heat exchange.

One configuration of the invention may provide control means to allow for heat sources (outdoor air, ground loop or other warm liquid waste stream) that are at temperatures above 60 F while operating in space heating and water heating modes without overheating the compressor.

A control means may be further included to maintain acceptable compressor operating conditions when operating in cooling mode and the outdoor or ground loop temperature is cold enough to cause refrigerant to build up in the outdoor or ground loop condenser resulting in an under charged operating condition. Additionally, the control means may provide means to limit water heating temperature setpoint so that the compressor is not allowed to operate at compression ratios that are higher than the compressor manufacturer recommends as the outdoor or ground loop temperature falls below 45 F.

The invention uniquely integrates standard offering HVAC components to provide hydronic heating support, allowing the system to perform tasks normally provided by separately purchased products. The configuration and capabilities of the refrigerant valves and the Active Charge Management (ACM) system makes the addition of the direct water heating functions and dynamic transitions possible. Use of specially configured 3-way mixing valves, variable speed fan motors, and proprietary controls provide for temperature and pressure control features that protect the system and allow operation over a broad range of operating conditions.

Possible modification to the embodiments of the invention may include adding a metering device to release the pressure differential rather than using the ports within the direct acting 2-way solenoid valves. This will broaden the selection of possible valves which may or may not reduce cost and may increase the life of the valves.

Another possible modification may include a system with three heat exchanger circuits which could be advanced to support six modes of operation if an application was found where it is desirable for the third heat exchanger (water circuit) to operate in reverse for a water cooling mode. A third set of charge management valves (for adding and removing functions) may be required if the condenser is replaced with a heat pump coil. The charge management system may also be advanced to provide user selectable charge control criteria during water heating and cogeneration modes to optimize toward higher capacity or toward lower energy consumption.

Hot water discharge temperature control mechanism may be rearranged or changed to use different equipment and different control relationships. A warm heat source control mechanism may also be rearranged or changed to use different equipment and different control relationships.

Cold ambient space cooling support may be rearranged or changed to use different equipment and different control relationships.

Compression ratio limit control features, including the water heating setpoint setback function and the operating window cutout, may be implemented with different curves or relationships. Lastly, the compressor may remain outdoors in the air source configuration.

The invention will provide high-efficiency cooling and heating, and supplemental hydronic heating at operating costs below conventional hydronic heating components (or at little to no additional costs in cogeneration).

The invention will utilize two-stage or digital/variable speed compressors to achieve high-efficiency cooling and heating above standard HVAC equipment offerings, and utilize this high-efficiency operation for supplemental hydronic heating processes required at residential and commercial installations. Additional energy recovery functions may be utilized to provide supplemental hydronic heating.

The invention may include a system for controlling a multi-circuit heat pump. The system may accomplish this with the use of an accumulator configured to accumulate a liquid refrigerant and pass a vapor refrigerant, a compressor operably coupled to the accumulator and configured to compress the vapor refrigerant, a condenser configured to receive the vapor refrigerant and condense the vapor refrigerant to liquid refrigerant, and a check valve configured to receive the liquid refrigerant from the condenser and configured to prohibit a flow of liquid refrigerant backwards through the condenser.

At least one heat pump coil may be configured to receive the vapor refrigerant and condense the vapor refrigerant into liquid refrigerant, and also receive the liquid refrigerant and evaporate the liquid refrigerant into vapor refrigerant. At least one expansion valve may be fluidly coupled with the at least heat pump coil and configured to bypass liquid refrigerant when the at least one heat pump coil is condensing. The expansion valve may be configured to expand the liquid refrigerant to a liquid and vapor mixture when the heat pump coil is evaporating. A plurality of refrigerant valves may fluidly couple the compressor, the accumulator, the condenser, the heat pump coil, and the expansion valve. A fan may be operably coupled to the heat pump coil and configured to flow air across the heat pump coil. A pump may also be operably coupled to the heat pump coil and configured to flow a liquid, such as water, through the heat pump coil A controller may control the operation of the entire system by being programmed to control an air cooling mode, an air heating mode, a water heating mode, a defrost mode, and a cogeneration mode that includes simultaneous air cooling and water heating modes. These modes all operate using the same hardware, but the flow of refrigerant and water may be changed through modulation of various valves to produce a different function in each mode.

A liquid reservoir may also be included and configured to supply hydronic heating water for the water heating mode and an indirect water heater for potable water heating. A circulation pump may be configured to pump liquid fluidly coupled to one of the liquid reservoir and the indirect water heater to the condenser.

A bypass connection may be included between a liquid discharge of the condenser and a mixing valve that is configured to control a temperature of a liquid entering the condenser by recirculating a heated liquid through the circulation pump.

The system may include a system balancer that contains at least one refrigerant valve fluidly coupled between a liquid refrigerant side of the heat pump coil and an inlet to the accumulator. The system balancer may also have an additional refrigerant valve fluidly coupling the liquid refrigerant with a vapor side of the heat pump coil.

In order to balance the refrigerant charge in the system, the system may be configured with at least one add charge refrigerant valve fluidly coupling the liquid refrigerant side of the heat pump coil with the inlet to the accumulator and at least one remove charge refrigerant valve fluidly coupling the common liquid refrigerant piping to the vapor side of the of the heat pump coil.

The controller may be matched up with any combination of heat pump style heat exchangers and an appropriate control sequence could be defined if the one developed for the residential models does not properly support a proposed configuration of heat pump coils. Heat pump coils generally involve air or a liquid which implies fans and dampers or pumps and valves to manage the air or liquid side of the heat pump coil. The heat pump coil is preferably equipped with a variable speed fan configured to flow air across the heat pump coil resulting in heat being rejected during the air cooling mode and heat being collected during the air and water heating modes.

A plurality of temperature and pressure sensors may operably couple the liquid and vapor refrigerant with the controller. An additional variable speed system balancer fan may be included with an additional heat pump coil which may be operably controlled by the controller with an input from the plurality of temperature and pressure sensors.

An outdoor ambient air energy exchange source for the heat pump coil may be used in the form of a ground source or an air source. An evaporator configured to receive the liquid refrigerant and evaporate the liquid refrigerant into vapor refrigerant may be included in either source, but preferably is used with the ground source. Preferably, the evaporator is used for the ground source (or could be used for a liquid process) in lieu of the system balancer heat pump coil that is used for air source.

Either the ground source or the air source systems may also include a second expansion valve coupled with the evaporator and configured to expand the liquid refrigerant into a liquid and vapor mixture before it enters the evaporator. The ground source configuration preferably includes a plurality of refrigerant valves fluidly coupling the compressor, the accumulator, the condenser, the heat pump coil, the at least one expansion valve, the second expansion valve, and the evaporator. A diverting valve in communication with the controller and may be configured to place either the ground source energy exchange source or a liquid reservoir in fluid communication with the condenser.

A second heat pump coil may be included in either the ground source or the air source that is fluidly coupled to the evaporator and configured to collect heat during the heating mode, when the evaporator is in use. A bypass connection between a liquid refrigerant discharge of the evaporator and a mixing valve may also be included. The mixing valve may be configured to control a temperature of liquid, such as water, entering the evaporator by recirculating a cooled liquid, such as water, through the evaporator. A liquid heat source may also be fluidly coupled to the condenser and the evaporator.

Either the ground source system or the air source system may include a first refrigerant valve in fluid communication with a liquid refrigerant side of the at least one heat pump coil and an inlet to the accumulator. A second refrigerant valve may also be included and in fluid communication with a liquid refrigerant side of the evaporator and the inlet to the accumulator. A third refrigerant valve may be included that is in fluid communication with a vapor refrigerant side of the heat pump coil. Lastly, a fourth refrigerant valve may be used and in fluid communication with a vapor refrigerant side of the evaporator.

A method of controlling the multi-circuit heat pump may consist of accumulating a liquid refrigerant and passing a vapor refrigerant with an accumulator configured to pass a vapor refrigerant to a compressor, compressing the vapor refrigerant with the compressor, condensing the compressed vapor refrigerant to a liquid refrigerant with a condenser, and prohibiting the flowing of the liquid refrigerant backwards through the condenser with a check valve. The inventive method may further include passing liquid and vapor refrigerant through at least one heat pump coil, condensing the vapor refrigerant into a liquid refrigerant and evaporating the liquid refrigerant into a vapor refrigerant, and expanding the liquid refrigerant to a liquid and vapor mixture when the at least one heat pump coil is evaporating with at least one expansion valve. Preferably, it also includes programming a controller for controlling an indoor air cooling mode, an indoor air heating mode, a water heating mode, a defrosting mode, and a cogeneration mode that includes simultaneous indoor air cooling and water heating modes.

The method preferably further includes programming the controller to transition between the indoor air cooling mode and the cogeneration mode while continuously operating the compressor, programming the controller to transition between the cogeneration mode and the water heating mode while continuously operating the compressor, and programming the controller to transition between the indoor air heating mode and the water heating mode while continuously operating the compressor.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
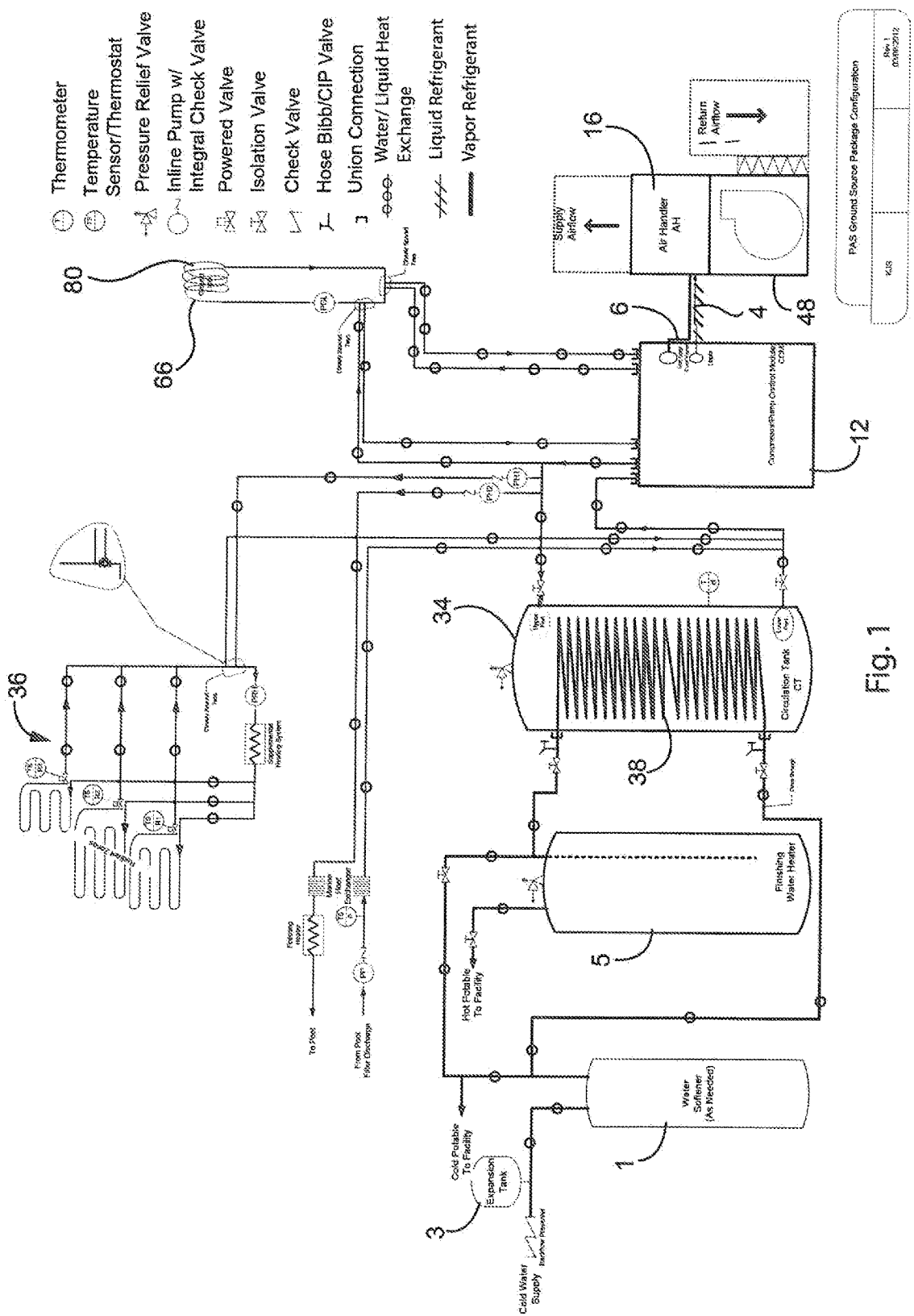
FIG. 1 is a schematic view of a ground source system detailing the flow of water and flow of refrigerant between major mechanical components.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION OF EMBODIMENTS

The present invention and the various features and advantageous details thereof are explained more fully with reference to the non-limiting embodiments described in detail in the following description.

1. System Overview

This invention pertains to a heating, cooling, and "direct" water heating system that can reliably heat and cool a space or process and heat water for use in residential, commercial, industrial and agricultural "facility" applications where water heating is a significant requirement.

Many heat pump systems will use a portion of the heat rejected by the space cooling process for water heating. Some heat pump water heaters will heat water and provide some dehumidification and localized space cooling while doing so.

One intent of this invention is to develop a multi-split heat pump style system that provides heating, cooling, and direct water heating functions independently, as the demands and priorities of the facility change.

Basic components readily available in the HVAC marketplace include: refrigerant pipe/fittings, water pipe/fittings, refrigerant compressor, water pumps, water and refrigerant valves, heat exchangers (water cooled condenser, water heated chiller, indoor heat pump air handler or fossil fuel furnace with add-on heat pump coil, outdoor air source heat pump coil), refrigerant oil separator, refrigerant accumulator, safety limiting devices (water flow, refrigerant pressure, refrigerant temperature, etc), electrical components, and controls. An indirect water heater is also configured with the system to provide potable water preheating and a reservoir for hydronic heating support. A cabinet may also be provided to house the CCM.

The configuration of the indirect water heater within the system is opposite of its typical use in the industry. Heated/treated water will be circulated through the tank (closed loop) while potable water will be preheated through an indirect heating coil, which may be constructed from stainless steel or another suitable material.

The invention includes: two-stage high-efficiency cooling, two stages of heat pump heating with market appropriate (electric or fossil fuel) back-up, direct water heating which may be used to preheat potable water and provide supplemental hydronic heating support for applications like pool heating and radiant floor heating.

There are two types of HVAC products in the residential offering: air source and ground source. Both styles provide space heating and cooling with direct water heating.

The air source system utilizes a compressor-less outdoor System Balancer for space heating and cooling. The System Balancer works in harmony with the Compressor Control Module to reject heat to the outdoors when not needed for hydronic heating purposes. It also operates as an air source heat pump, extracting heat from outside air for space heating in the winter, and as a year round source for supplemental hydronic heating when space cooling is not active.

The ground source system utilizes ground source resources to reject heat when not needed for hydronic heating purposes with air conditioning provided by the forced air system. It also operates as a geothermal heat pump, extracting heat from ground source resources for space heating in the winter, and as a year round source for supplemental hydronic heating when cooling is not active. Because the ground source system is capable of maintaining capacity through the winter, it may be utilized for primary hydronic space heating such as a radiant floor system.

Whether the unit is an air source or a ground source system, the Compressor Control Module (CCM) is the main control center for the system. The system utilizes state of the art Digital Control for system performance and reliability. Unlike most conventional systems, the controls are factory installed and only remote sensors are required in the local installation.

The CCM contains a high-efficiency 2-stage compressor, hydronic heat exchanger(s), and digital control system. The CCM controls an efficient variable speed fan in the System Balancer to allow operation over a wide range of outdoor temperatures.

A reservoir tank for supplemental hydronic heating (or primary hydronic heating for ground source systems) and potable water preheating is also included in the system.

The system is also designed to be utilized with locally supplied variable speed air handlers with built in electric backup to meet regional market demands.

The system is designed to be utilized with locally supplied variable speed high efficiency furnaces with add-on heat pump coils to meet regional market demands.

The system will readily adapt beyond the residential application to almost any air or hydronic heating and cooling requirement in a process or commercial building environment control system. It can be matched with specially designed air or water heat pump coil systems for efficiently recovering waste heat for desired heating or water heating processes or rejecting excess heat for desired cooling processes.

Unlike other heat pump products that may heat water as a result of capturing a small percentage of the rejected heat when operating in the cooling mode, the system is designed to provide direct year round water heating for preheating potable water and supplemental hydronic applications. The system collects heat from the outdoor air via the system balancer or from the ground. Radiant floor and pool heating support is accomplished at the efficiency of the heat pump.

The system is designed to meet consumers requirements for high-efficiency heating and cooling with supplemental hydronic heating support. Whether air source or geothermal, with additional electric or fossil fuel energy sources, the system is designed to meet market requirements.

The inventive system is more versatile than the residential configuration because it can use specially designed air and water heat exchangers for efficiently recovering waste or rejected heat from almost any process or environment, and for then moving it to where ifs needed. It readily adapts to almost any air/hydronic heating and cooling requirement in a process or building environment control system.

The system can be installed in a variety of settings and facilities including restaurants, laundromats, hospitals, schools, truck stops, rest stops, parks, campgrounds, public pools, health clubs, spas, agricultural facilities, and anywhere conventional HVAC and water heating systems may be used.

The system is designed to take advantage of today's market requirements for high-efficiency heating and cooling with supplemental hydronic requirements—either as a conventional air source, or geothermal system with energy recovery capabilities.

2. Resume

In one embodiment of the invention, a ground source may be used for thermal energy exchange of a heat pump. A ground source consists of shallow wells, ponds, lakes, or a buried pipe. Ground sources are not to be considered the same as a geothermal source. For example, ground source heat pumps use shallow wells, ponds/lakes or buried pipe that do not need to have any connection to geothermal activity.

Water, which may be mixed with antifreeze, typically enters a ground source system at temperatures between 25 F and 120 F. A ground source heat pump may use any water source for heat collection and heat rejection that falls within that range of temperatures. However, when using the water as a heat source (evaporating/heating mode), the uncontrolled temperature typically needs to fall between 25 F and 75 F for stable safe operation. When using water as a heat sink (condensing/cooling mode), the uncontrolled temperature typically needs to fall between 45 F and 120 F for stable safe operation. The lower limit (25 F) is determined by the concentration of antifreeze and may vary from installation to installation to allow the system to operate when the mixture temperature falls below 32 F. Antifreeze impacts the performance of the system so it is typically minimized within acceptable limits.

By incorporating a mixing valve that serves a water evaporator, the invention may use water as a heat source at temperatures from 251 to temperatures in the range of 180 F. By using the mixing valve that serves the condenser, the invention may use water as a heat sink at temperatures from 25 F to 120 F. This effect for the condenser mixing valve is insignificant and would not warrant the use of the valve except for the fact that the invention may support hydronic heating which requires that the water being sent to the hydronic heating system to be warm enough to provide a heating effect. Therefore, the invention uses the condenser mixing valve to hold the condenser water discharge temperature at a temperature between 75 F and 130 F while the water coming into the cold side of the mixing valve may range from 25 F to 120 F. A controller further limits hydronic heating operation so that the temperature of water sent to the hydronic heating system never falls below 75 F. When the circulating tank temperature falls to 75 F, the hydronic heating operation is disabled until the tank is reheated to the deadband temperature. The deadband is a temperature setpoint between 80 F and 110 F that an installing contractor selects to provide the desired temperature of water to the hydronic heating system.

The function of the four modes of operation is described as follows. The System Balancer Fan is running whenever the System Balancer heat exchanger (SB) is in use. The air handler (or furnace) fan is running whenever the air handler heat exchanger (AH) is in use. The hot water circulating pump (P1) is running whenever the water cooled condenser (WC) is in use.

Figure 11:
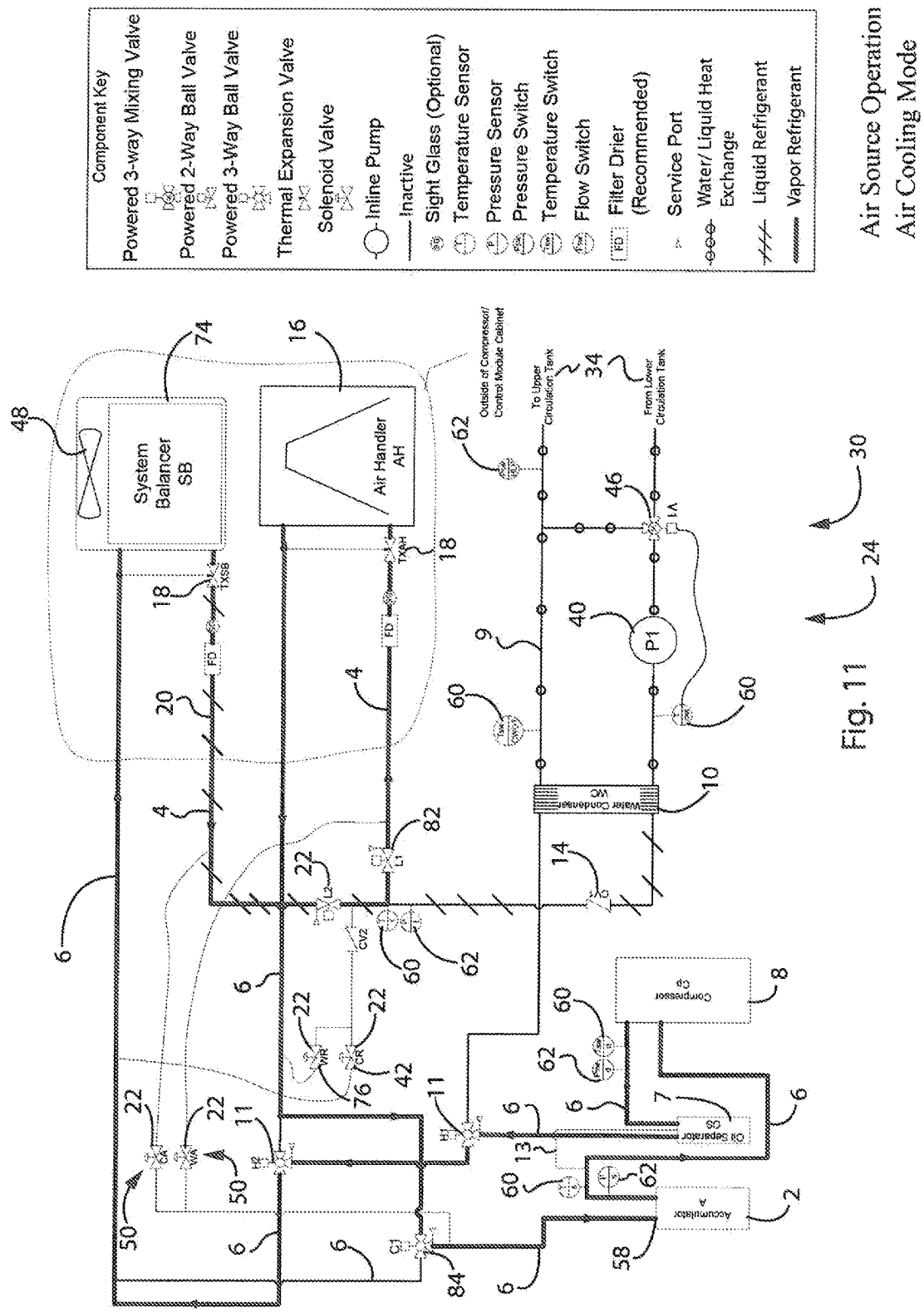
FIG. 11 is a schematic view of an air cooling mode for an air source system.

The hot water circuitry of the air source version of FIG. 11 is described as follows. Water is circulated during cogeneration and water heating modes. Water is circulated from the circulation tank through 3-way mixing valve (V1), through pump (P1) and through the water cooled condenser WC before returning to the circulation tank. A bypass connection is made from the discharge of the water cooled condenser C to the branch connection on valve V1. Valve V1 limits how cold the water entering the water condenser is allowed to get by recirculating heated water. This allows the system to generate a variable volume of water that is always warm enough to support a low temperature hydronic heating application.

FIG. 11 presents the flow of refrigerant and water while the air source system is operating in the cooling mode. The compressor (Cp) discharges hot refrigerant vapor to oil separator (OS). The oil separator discharges refrigerant to a 3-way valve (H1) and oil to the suction line. Valve H1 directs hot refrigerant vapor to a second 3-way valve (H2). Valve H2 directs hot refrigerant vapor to the System Balancer heat exchanger SB where the refrigerant is condensed to a liquid as it is cooled by cross flow air in the heat exchanger. From SB, the refrigerant passes through the bypass check valve inside of the system balancer thermal expansion valve (TXSB). The liquid refrigerant then passes through a sight glass and bi-directional filter drier (recommended installation) on its way to 2-way valve (L2). From valve L2, the refrigerant flows to valve (L1) and then through another bi-directional filter drier and sight glass (recommended installation). From there, the liquid refrigerant enters the furnace or air handler heat pump coil's thermal expansion valve (TXAH). The liquid refrigerant is expanded to a liquid vapor mixture as it passes through valve TXAH. The refrigerant mixture then passes through the heat pump coil AH where the liquid refrigerant in the mixture is evaporated which produces the cooling effect (the air is cooled). The mixture is heated to a superheated vapor before it exits heat pump coil AH and is then routed to valve C1. After passing through valve (C1), the refrigerant vapor passes through accumulator (A) and then into the suction port on compressor Cp.

Figure 12:
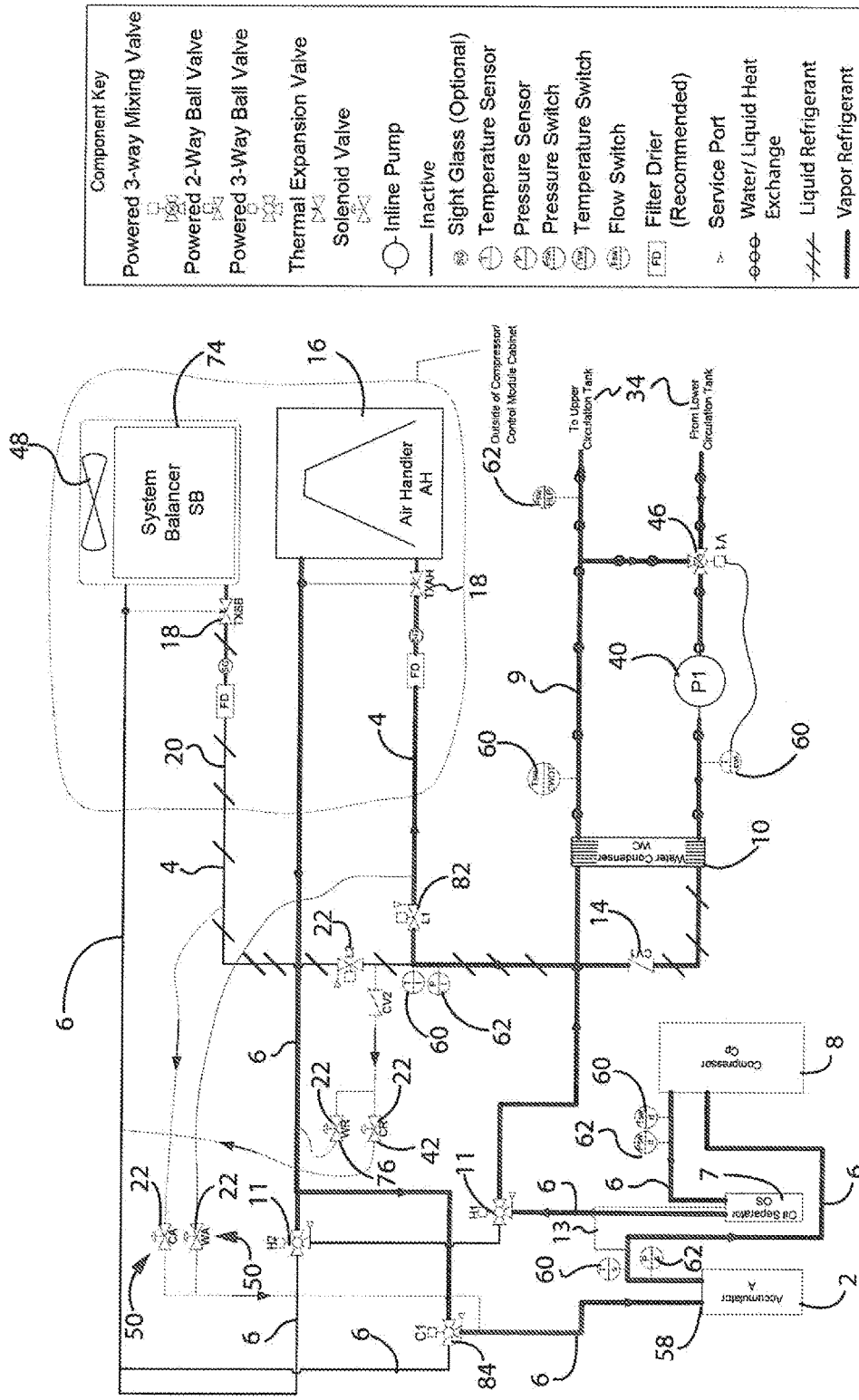
FIG. 12 is a schematic view of a cogeneration mode for an air source system.

FIG. 12 presents the flow of refrigerant and water while the air source system is operating in the cogeneration mode. The compressor Cp discharges hot refrigerant vapor to oil separator OS. The oil separator discharges refrigerant to a 3-way valve H1 and oil to the suction line. Valve H1 directs hot refrigerant vapor to water cooled condenser WC where the refrigerant is condensed to a liquid as it is cooled by counter flow water in the heat exchanger (the water is heated). From WC, the refrigerant passes through check valve CV1. The liquid refrigerant then passes through 2-way valve L1 and a sight glass and bi-directional filter drier (recommended installation) on its way to the furnace or air handler heat pump coil's thermal expansion valve TXAH. The liquid refrigerant is expanded to a liquid vapor mixture as it passes through valve TXAH. The refrigerant mixture then passes through the heat pump coil AH where the liquid refrigerant in the mixture is evaporated which produces the cooling effect (the air is cooled). The mixture is heated to a superheated vapor before it exits heat pump coil AH and is then routed to valve C1. After passing through valve C1, the refrigerant vapor passes through accumulator A and then into the suction port on compressor Cp.

Figure 13:
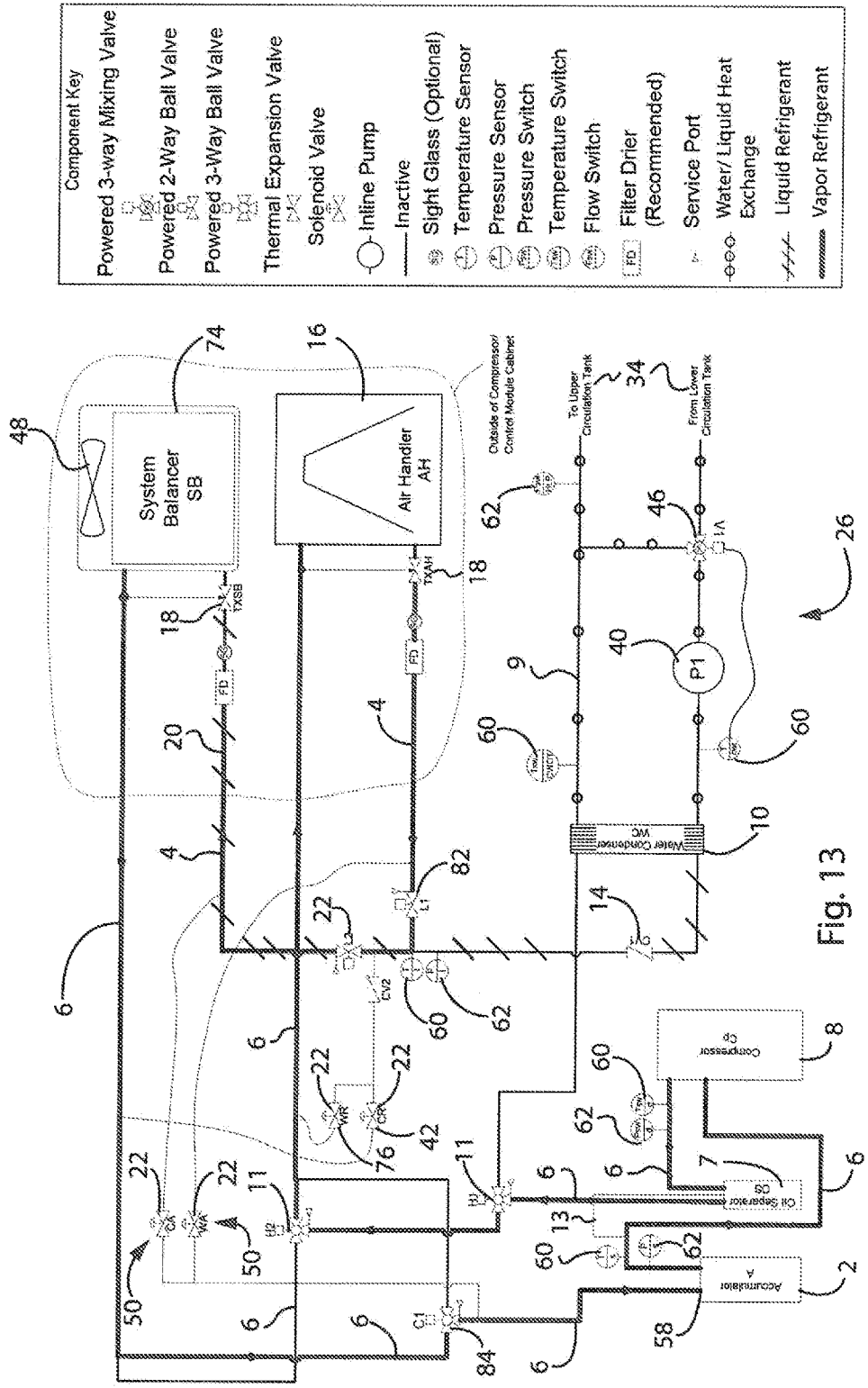
FIG. 13 is a schematic view of a forced air heating mode for an air source system.

FIG. 13 presents the flow of refrigerant and water while the air source system is operating in the heating mode. The compressor Cp discharges hot refrigerant vapor to oil separator OS. The oil separator discharges refrigerant to a 3-way valve H1 and oil to the suction line. Valve H1 directs hot refrigerant vapor to a second 3-way valve H2. Valve H2 directs hot refrigerant vapor to the furnace or air handler heat pump coil AH where the hot vapor refrigerant is condensed to a liquid by cross flow air over the coil producing the space heating effect (the air is heated). On leaving heat pump coil AH the liquid refrigerant passes through the bypass check valve inside of the furnace or air handler heat pump coil's thermal expansion valve TXAH. The liquid refrigerant then passes through a sight glass and bi-directional filter drier (recommended installation) on its way to 2-way valve L1. From valve L1 the refrigerant flows through valve L2 and then through another bi-directional filter drier and sight glass (recommended installation). From there the liquid refrigerant enters the System Balancer thermal expansion valve TXSB. The liquid refrigerant is expanded to a liquid vapor mixture as it passes through valve TXSB. The refrigerant mixture then passes through the System Balancer heat pump coil SB where the liquid refrigerant in the mixture is evaporated which produces a cooling effect to collect energy from the outdoor air. The mixture is heated to a superheated vapor before it exits heat pump coil SB and is then routed to valve C1. After passing through valve C1, the refrigerant vapor passes through accumulator A and then into the suction port on compressor Cp.

Figure 14:
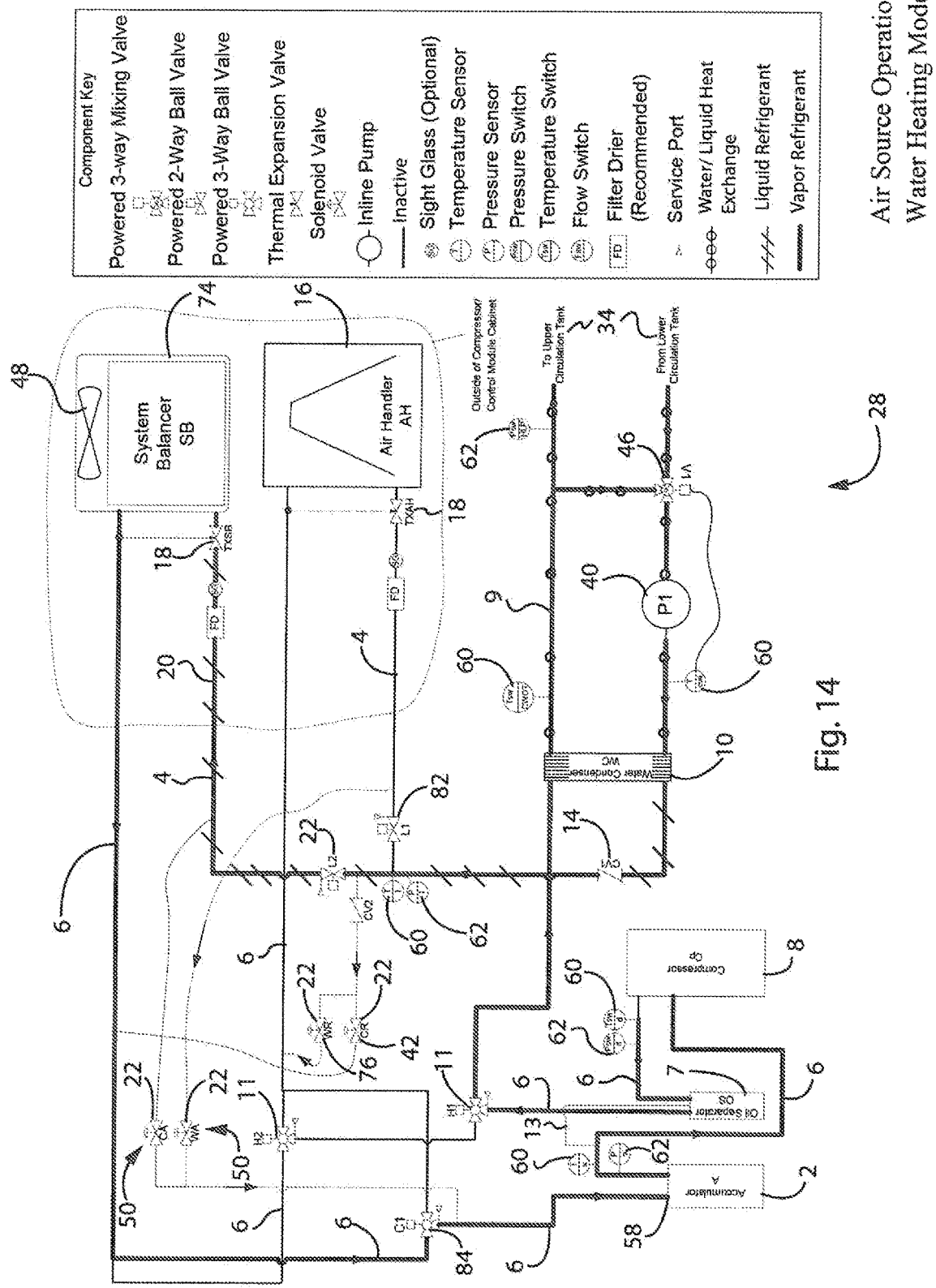
FIG. 14 is a schematic view of a water heating mode for an air source system.

FIG. 14 presents the flow of refrigerant and water while the air source system is operating in the water heating mode. The compressor Cp discharges hot refrigerant vapor to oil separator OS. The oil separator discharges refrigerant to a 3-way valve H1 and oil to the suction line. Valve H1 directs hot refrigerant vapor to the water cooled condenser WC where the refrigerant is condensed to a liquid as it is cooled by counter flow water in the heat exchanger (the water is heated). From WC, the refrigerant passes through check valve CV1. The liquid refrigerant then passes through 2-way valve L2 and a sight glass and bi-directional filter drier (recommended installation) on its way to the System Balancer heat pump coil's thermal expansion valve TXSB. The liquid refrigerant is expanded to a liquid vapor mixture as it passes through valve TXSB. The refrigerant mixture then passes through the System Balancer heat pump coil SB where the liquid refrigerant in the mixture is evaporated which produces a cooling effect to collect energy from the outdoor air. The mixture is heated to a superheated vapor before it exits heat pump coil SB and is then routed to valve C1. After passing through valve C1, the refrigerant vapor passes through accumulator A and then into the suction port on compressor Cp.

Figure 3:
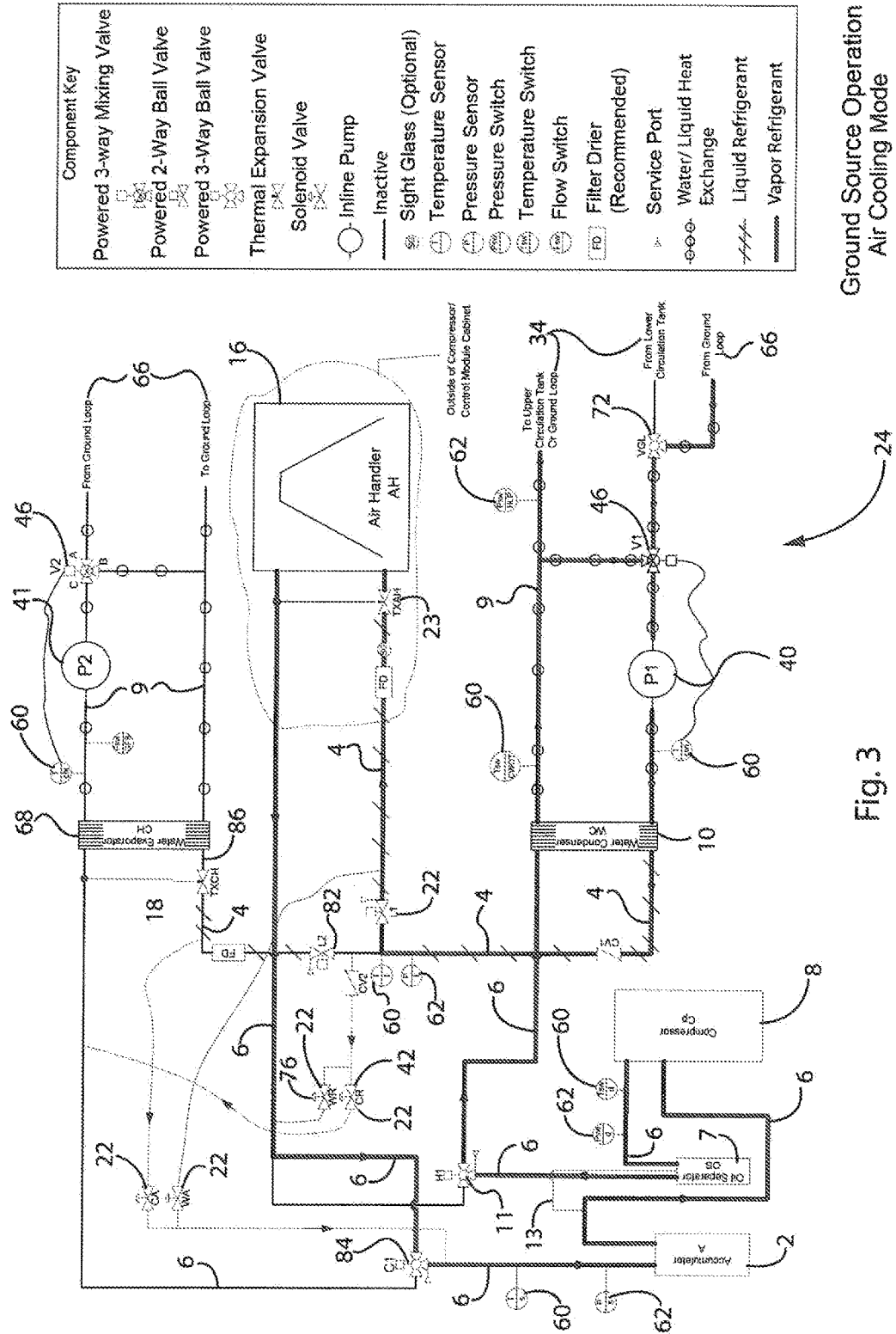
FIG. 3 is a schematic view of an air cooling mode for a ground source system.

The ground source system of the present embodiment is configured as shown in FIG. 3 and its function is described as follows for the four modes of operation. The Water Evaporator pump (P3) is running whenever the Water Evaporator heat exchanger (CH) is in use. The air handler (or furnace) fan is running whenever the heat pump coil AH is in use. The hot water circulating pump P1 is running whenever the water cooled condenser WC is in use.

The hot water circuitry of the ground source version is illustrated in FIG. 3 and described as follows. Water is circulated through the branch side of diverting valve VGL to connect with the ground loop during normal cooling and through the run side of diverting valve VGL to connect with the reservoir during cogeneration and water heating. Water is passed from diverting valve VGL through 3-way mixing valve (V1), through pump (P1) and through the water cooled condenser WC before returning to the circulation tank. A bypass connection is made from the discharge of the water cooled condenser C to the branch connection on valve V1. Valve V1 limits how cold the water entering the water condenser is allowed to get by recirculating heated water. This allows the system to generate a variable volume of water that is always warm enough to support a low temperature hydronic heating application.

The cool water circuitry of the ground source version is illustrated in FIG. 3 and described as follows. Cool water is circulated during forced air heating and water heating modes. Water is circulated from the ground loop through 3-way mixing valve (V2), through pump (P2) and through the water heated evaporator CH before returning to the ground loop. A bypass connection is made from the discharge of the water evaporator CH to the branch connection on valve V2. Valve V2 limits how warm the water entering the water evaporator is allowed to get by recirculating cooled water. This allows the system to accept a variable volume of water that is warmer than 60 F as may be encountered in some ground source systems or in any number of commercial wastewater streams (Note: A wastewater to water heat exchanger will be required to avoid fouling the water evaporator CH).

FIG. 3 presents the flow of refrigerant and water while the ground source system is operating in the cooling mode. The compressor Cp discharges hot refrigerant vapor to oil separator OS. The oil separator discharges refrigerant to a 3-way valve H1 and oil to the suction line. Valve H1 directs hot refrigerant vapor to water cooled condenser WC where the refrigerant is condensed to a liquid as it is cooled by counter flow water in the heat exchanger (the water is heated). From WC, the refrigerant passes through check valve CV1. The liquid refrigerant then passes through 2-way valve L1 and a sight glass and bi-directional filter drier (recommended installation) on its way to the furnace or air handler heat pump coil's thermal expansion valve TXAH. The liquid refrigerant is expanded to a liquid vapor mixture as it passes through valve TXAH. The refrigerant mixture then passes through heat pump coil AH where the liquid refrigerant in the mixture is evaporated which produces the cooling effect (the air is cooled). The mixture is heated to a superheated vapor before it exits heat pump coil AH and is then routed to valve C1. After passing through valve C1, the refrigerant vapor passes through accumulator A and then into the suction port on compressor Cp.

Figure 4:
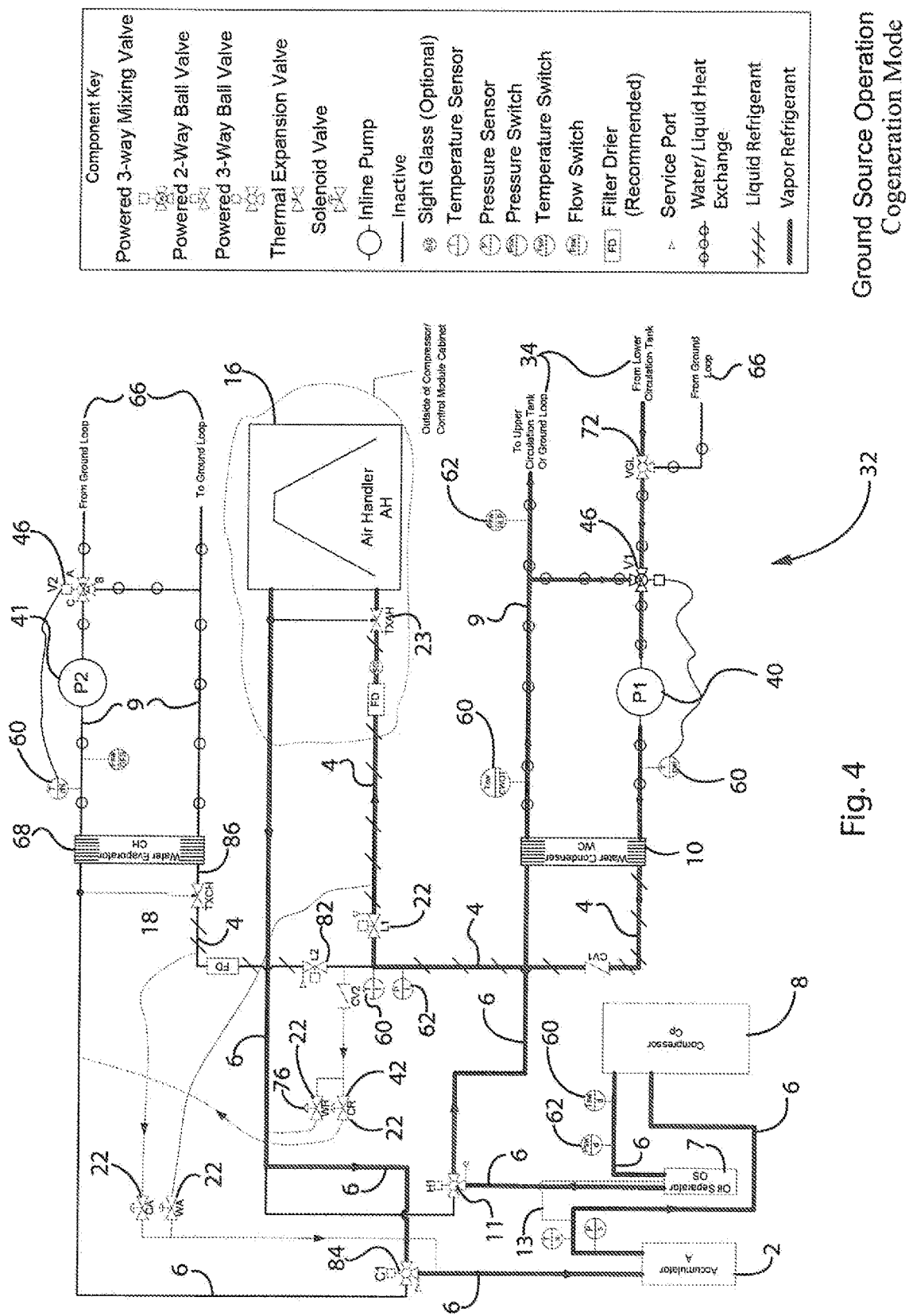
FIG. 4 is a schematic view of a cogeneration mode for a ground source system.

Normal Space Cooling and Cogeneration are the same for the ground source system as far as the refrigerant circuit behavior. The difference between normal cooling and cogeneration is that 3-way valve VGL in the hot water circuit is opened to the ground loop during Normal Cooling mode as shown in FIG. 3 and to the circulation tank during Cogeneration mode as shown in FIG. 4. A separate ground loop pump PGL (if installed, see FIG. 1) may also be operating to circulate water through the ground loop itself.

Figure 5:
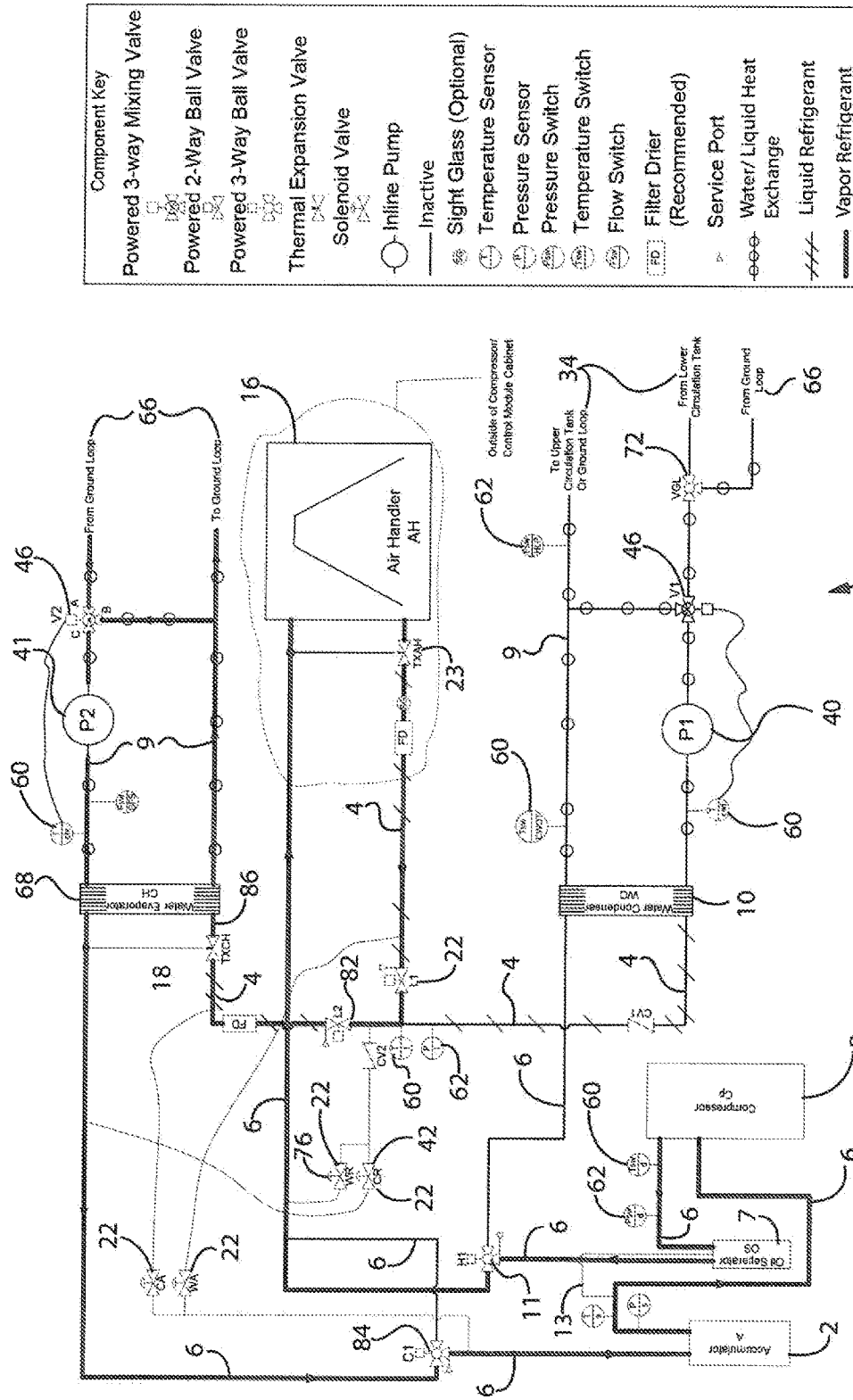
FIG. 5 is a schematic view of a forced air heating mode for a ground source system.

FIG. 5 presents the flow of refrigerant and water while the ground source system is operating in the heating mode. The compressor Cp discharges hot refrigerant vapor to oil separator OS. The oil separator discharges refrigerant to a 3-way valve H1 and oil to the suction line. Valve H1 directs hot refrigerant vapor to the furnace or air handler heat pump coil AH where the hot vapor refrigerant is condensed to a liquid by cross flow air over the coil producing the space heating effect (the air is heated). On leaving heat pump coil AH, the liquid refrigerant passes through the bypass check valve inside of the furnace or air handler heat pump coil's thermal expansion valve TXAH. The liquid refrigerant then passes through a sight glass and bi-directional filter drier (recommended installation) on its way to 2-way valve L1. From valve L1, the refrigerant flows to valve L2 and then through another bi-directional filter drier and sight glass. From there, the liquid refrigerant enters the Water Evaporator thermal expansion valve TXCH. The liquid refrigerant is expanded to a liquid vapor mixture as it passes through valve TXHC. The refrigerant mixture then passes through the Water Evaporator heat exchanger CH where the liquid refrigerant in the mixture is evaporated which produces a cooling affect to collect energy from the water being circulated in the ground loop. The mixture is heated to a superheated vapor before it exits CH and is then routed to valve C1. After passing through valve C1, the refrigerant vapor passes through accumulator A and then into the suction port on compressor Cp.

Figure 6:
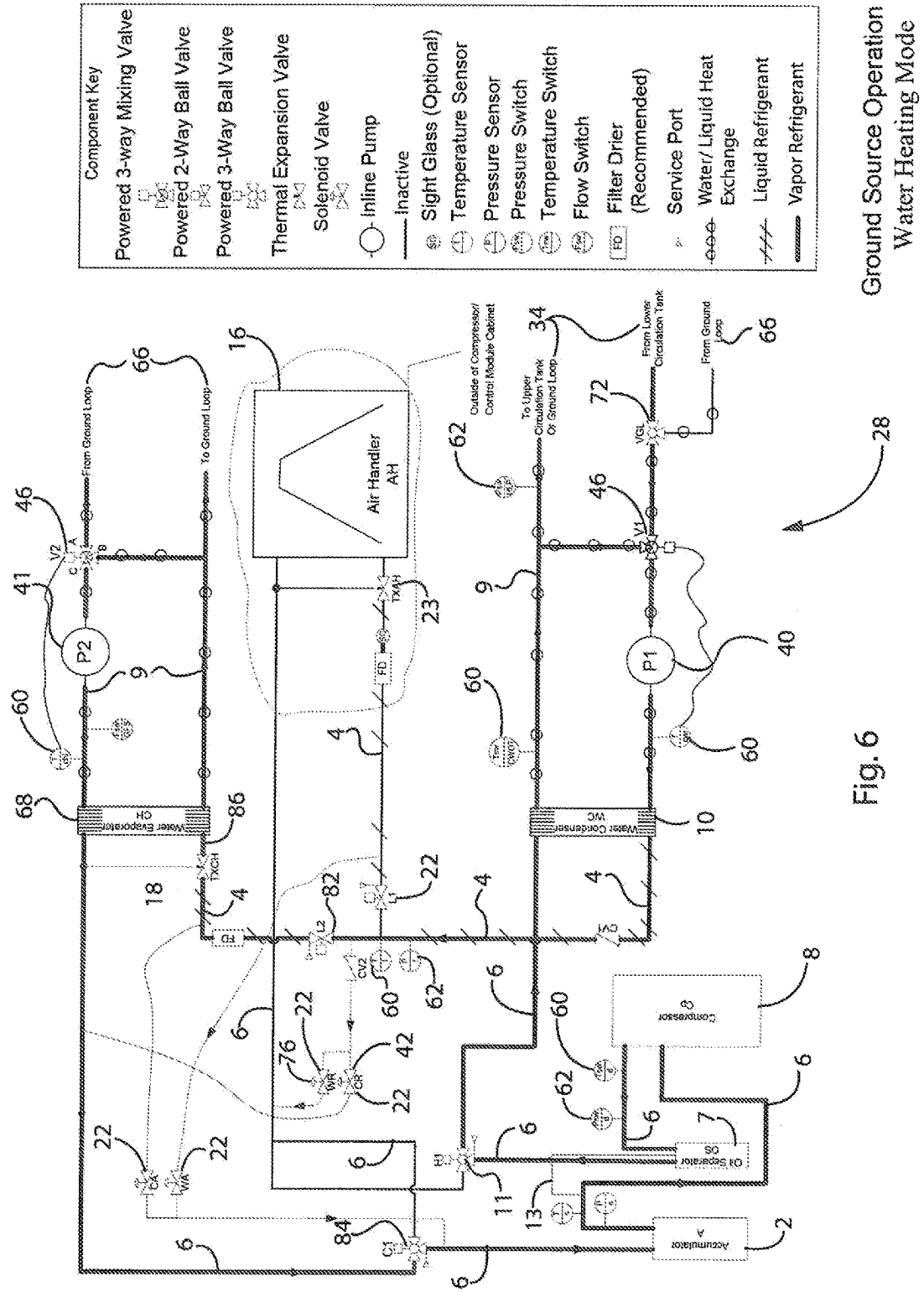
FIG. 6 is a schematic view of a water heating mode for a ground source system.

FIG. 6 presents the flow of refrigerant and water while the ground source system is operating in the water heating mode. The compressor Cp discharges hot refrigerant vapor to oil separator OS. The oil separator discharges refrigerant to a 3-way valve H1 and oil to the suction line. Valve H1 directs hot refrigerant vapor to water cooled condenser WC where the refrigerant is condensed to a liquid as it is cooled by counter flow water in the heat exchanger (the water is heated). From WC, the refrigerant passes through check valve CV1. The liquid refrigerant then passes through 2-way valve L2 and then through a sight glass and bi-directional filter drier (recommended installation). From there the liquid refrigerant enters the Water Evaporator thermal expansion valve TXCH. The liquid refrigerant is expanded to a liquid vapor mixture as it passes through valve TXCH. The refrigerant mixture then passes through the Water Evaporator heat exchanger CH where the liquid refrigerant in the mixture is evaporated which produces a cooling effect to collect energy from the water being circulated in the ground loop. The mixture is heated to a superheated vapor before it exits CH and is then routed to valve C1 After passing through valve C1, the refrigerant vapor passes through accumulator A and then into the suction port on compressor Cp.

Active charge management valves CA, CR, WA and WR are connected to the piping to allow refrigerant to be moved into or out of the active refrigerant circuit during cogeneration and water heating modes for both the Air Source and Ground Source systems. The add charge valve for water heating mode (WA) is connected upstream to the liquid line between valves L1 and TXAH and downstream to a common line that discharges into the piping between the suction 3-way valve C1 and accumulator A. The add charge valve for cogeneration mode (CA) is connected upstream to the liquid line between valves L2 and TXSB and downstream to a common line that discharges into the piping between the suction 3-way valve C1 and the accumulator. The remove charge valves both draw refrigerant from the liquid intersection piping between valves L1 and L2 through a small check valve CV2. The remove charge valve for water heating mode (WR) then discharges into the vapor pipe between the system balancer and 3-way valves H2 and C1. The remove charge valve for cogeneration mode (CR) then discharges into the vapor pipe between the air handler and 3-way valves H2 and C1.

Charge is adjusted (added to or removed from the active circuit) according to proprietary rules and sequences defined in the control specification. The purpose is to avoid over pressuring the system due to excessive charge and to adjust charge so that superheat and subcooling are held within an industry accepted range during operation.

The charge management connections are unique nonstandard connections (Connections involving valves CV2, WA, WR, CA, and CR.

Connecting three heat exchangers within the same refrigerant control circuit allows four (up to 6) modes of operation is unique (heating, cooling, water heating and cogeneration).

Two 2-way positive isolation valves could replace valve C1. Two 2-way positive isolation valves could be used to replace valve H1. Two 2-way positive isolation valves could be used to replace valve H1 This would, however, be more expensive than one 3-way valve.

Solenoid operated 2-way valves could be used in place of valves L1 and L2. Care would be required to adjust the charge management process so that refrigerant that inherently leaks through these valves is returned to the active circuit while in operation. The timing of actuation in the control sequence would also be modified. It is possible, but not likely, that check valves would be required to avoid undesirable backflow through the solenoid operated valves.

If a suitable application existed, it would be possible to modify this configuration slightly to produce 6 modes of operation if the water condenser were converted to a heat pump coil and was allowed to operate for both heating and cooling. Check valve CV1 would be replaced with a 2-way valve (L3) and an additional 3-way suction valve (C2) would be required. Additional charge management valves may also be applied as needed.

The arrangement of heat exchanger connections to valves H1 and H2 could be switched around as long as the associated piping and control changes are made.

A subset of the configuration and function could be created by eliminating any valve or heat exchanger. However, that would essentially result in a conventional heat pump or heat pump water heater.

The water mixing valves (V1 and V2) on the water side of the configuration could be eliminated in circumstances where operating conditions (water temperature) are properly constrained by other means. They could also be moved around or moved outside of the CCM. Valve V1 could be moved so that the common port receives flow from the outlet of the water cooled condenser and diverts heated water through the run or bypass port to mix with return water prior to the inlet of pump P1. Valve V2 could be moved so that the common port receives cooled water from the outlet of the water chiller and diverts cooled water through the run or bypass port to mix with return water prior to the inlet to pump P2. Valve VGL of the ground source system can be located on either the return side or discharge side (as shown in FIG. 13) of the water piping system.

It would be possible to design new 3-way and 4-way refrigerant valves to reduce the number of valves required.

3. Detailed Description

Beginning with FIG. 1, an overview of the ground source system detailing the flow of water is shown. Water may be supplied from any source such as a well or municipal water supply. Water pressure may be accumulated in an expansion tank 3. As needed, a water softener 1 may be used to condition the water for better taste or quality. A typical water heater 5 may be used supply hot potable water. The water may flow from the water softener or directly from the water supply, through an indirect water heater 38. The indirect water heater 38 functions as a heat exchanger inside of a liquid reservoir 34. Thermal energy may be exchanged from a ground source such as a ground loop as is known in the art. The preheated water from the indirect water heater 38 may then be passed into the cold water side of a typical water heater 5 for final heating to a desired temperature or passed into any heated water system or piping for whatever use may be desired. Thermal energy may also be exchanged from any liquid heat source 80 such as a ground source 66, pond, or a livestock sewage pit.

The thermal energy from the ground source 66 is transferred through the liquid reservoir 34 to the indirect water heater 38. The thermal energy gained from the ground source 66 may be used in hydronic water heating 36 for heating a commercial building or a residential building. The thermal energy gained from the ground source 66 may also be used to heat a swimming pool, or any other low temperature hydronic heating application. At the heart of the system, is a compressor pump control module "CCM" 12 that controls the flow of water through the system, as well as the flow of liquid refrigerant 4 and vapor refrigerant 6 through a heat pump coil 16. A fan 48 is included with the heat pump coil 16 to force air through the coil to provide useful space heating and cooling.

Figure 2:
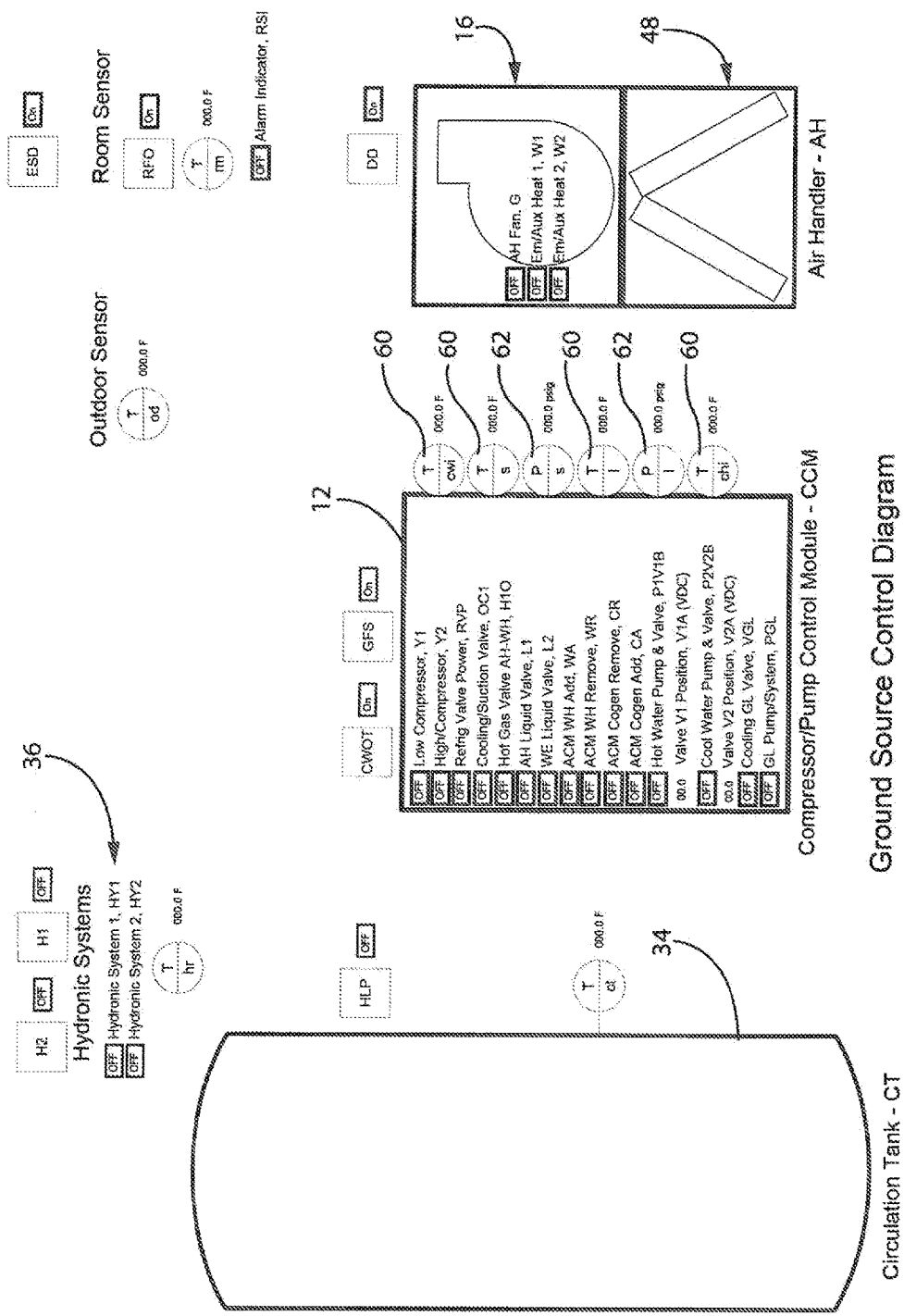
FIG. 2 is a representation of a control interface status screen for a ground source system that will display the inputs and outputs and provide access to the set point and configuration data entry screens.

Moving on to FIG. 2, the ground source control diagram is shown. The CCM 12 may be programmed to do a multitude of different tasks. A preferable selection of tasks is shown in the CCM 12. The CCM 12 preferably controls flow of water through the circulation tank 34, the function of the heat pump coil 16, and hydronic water heating 36.

The CCM 12 contains a control system composed of a DDC controller, relays, contactors, sensors, safety switches, and wiring as commonly applied in the art. The control system may be programmed to provide an array of configuration and set point options, mode, transition and charge management sequences, and the control signals required to operate compressors, fans, pumps, and valves as required for a specific set of supported applications and equipment configurations. For example, the control system configured for the preferred embodiment described in this application provides space heating, space cooling, water heating and cogeneration modes, and appropriate supporting functions for a residential application.

Transitioning now to FIG. 3, an air cooling mode 24 is shown for ground source operation. The legend included in the lower section of FIGS. 3-6 show where vapor refrigerant 6, liquid refrigerant 4, and water 9 flow. As shown in the legend, various water and refrigerant lines are not used in each mode and are indicated by thin lines. Also, each mode in the ground source operation uses the same hardware. The CCM 12 controls the operation of various water and refrigerant valves to change how the system functions which provides for the different modes of operation.

A compressor 8 compresses vapor refrigerant 6. Pressure sensors 62 and temperature sensors 60 placed at various locations throughout the system monitor the pressure and temperature of refrigerant and water in the CCM 12. The CCM 12 ensures that the compressor 8 and the entire system are operating at desirable and safe parameters. An oil separator 7 separates oil from the vapor refrigerant 6 that is used to lubricate the compressor 8. A suction line 13 may connect the oil separator to the compressor 8 to feed the oil back to the compressor 8.

The vapor refrigerant 6 flows from the compressor 8 to the condenser 10. The condenser transfers thermal energy from the heated vapor refrigerant 6 into water that is circulated with the liquid reservoir 34, as shown in FIG. 1. A circulation pump 40 circulates the water from the liquid reservoir 34 to the condenser 10. A mixing valve 46 controls the temperature of the water flowing to the liquid reservoir 34. The diverting valve 72 may also be used to divert water from the ground loop 66 to the condenser 10.

The vapor refrigerant 6 may be cooled into a liquid refrigerant 4 after passing through the condenser 10. A refrigerant valve 22 directs vapor refrigerant 6 to the heat pump coil 16. An expansion valve 23 may also be included to expand the liquid refrigerant entering the heat pump coil 16 so that heat pump coil 16 may heat the liquid refrigerant 4 back into a vapor refrigerant 6 before the liquid refrigerant 4 is passed to an accumulator 2, which accumulates the vapor refrigerant 6. A refrigerant valve 84 directs the vapor refrigerant 6 to flow to the accumulator 2 from the heat pump coil 16. The compressor 8 draws accumulated vapor refrigerant 6 from the accumulator 2 and repeats the cycle.

FIG. 4 shows the cogeneration mode 32 of the ground source operation. In the cogeneration mode 32, the refrigerant lines and water lines are active and function as described with reference to FIG. 3, except the water diverting valve 72 is open to the liquid reservoir 34. Cogeneration allows for simultaneous air cooling and water heating. The CCM 12 may be configured to heat water in the circulation tank 34, shown in FIG. 1, and also cool air for air-conditioning purposes at the same time.

When the ground source system starts, transitions to or is running in air cooling or cogeneration modes depicted in FIG. 3 and FIG. 4 the controller may actively adjust the operating charge in the active refrigerant circuit as described above for these modes of operation, this process is called Active Charge Management (ACM). A remove charge valve may be opened by the controller according to an algorithm to relieve excessive discharge pressure, reduce excessive subcooling or increase superheat within the active refrigerant circuit. An add charge management valve may be opened according to the algorithm to reduce excessive superheat or increase low subcooling. The controller seeks to hold discharge pressure below 510 psi, Superheat between 5 F and 20 F and Subcooling between 12 F and 25 F.

Turning now to FIG. 5, a forced air heating mode 26 for the ground source operation is shown. As previously stated, the hardware used and describes the respective FIGS. 3 and 4 of the same. In the forced air heating mode 26, vapor refrigerant 6 is compressed by the compressor 8 and flows through the oil separator 7. A valve 11 may be controlled by the CCM 12 to flow the vapor refrigerant 6 to the heat pump coil 16. The refrigerant may then flow as a liquid refrigerant 4 to refrigerant valve 22 controlled by the CCM 12 in through a second refrigerant valve 82 also controlled by the CCM 12. The liquid refrigerant 4 may then be expanded via expansion valve 18 before entering a liquid refrigerant side (may include vapor) 86 of evaporator 68. A second circulation pump 41 circulates water from ground loop 66 through the evaporator 68 in order to exchange thermal energy with the liquid refrigerant 4. A mixing valve 46 may be controlled by the CCM 12 to control the temperature of the water 9 in the ground loop 66. After flowing through the evaporator 68 the refrigerant in evaporator 68 is heated into a vapor refrigerant 6 and flows back to the accumulator 2. A third refrigerant valve 84 directs the flow of vapor refrigerant 6 back to the accumulator 2. The vapor refrigerant 6 then flows back to the compressor 8 and the cycle may be repeated.

FIG. 6 shows a water heating mode 28 for ground source operation. As previously stated, the hardware in the water heating mode 28 is the same for all the modes in ground source operation. In the water heating mode 28, the compressor 8 compresses vapor refrigerant 6 into the oil separator 7. Oil may be separated from the vapor refrigerant 6 where it may then be flowed back to the compressor through suction line 13 for lubrication. The vapor refrigerant 6 may then be directed by valve 11 to flow to condenser 10. The condenser 10 exchanges thermal energy between the water 9 and the vapor refrigerant 6. The water 9 may flow from the circulation tank 34 as directed by diverting valve 73 and controlled by the CCM 12 . . . . The mixing valve 46 controls the temperature of the water 9 while a circulation pump 40 flows the water through the circuit. The vapor refrigerant 6 becomes a liquid refrigerant 4 after passing through the condenser 10. The liquid refrigerant 4 may then flow through the second refrigerant valve 82 and through an expansion valve 18 where it enters the evaporator 60 on the liquid refrigerant side of the evaporator 86. Thermal energy may then be exchanged between the vapor refrigerant 6 and water 9 through the evaporator 68. The ground loop 66 provides a source for thermal energy while temperatures may be controlled with a mixing valve 46. A second circulation pump 41 flows water 9 through the system. The vapor refrigerant 6 may then flow back to accumulator 2 and is controlled by third refrigerant valve 84. The accumulator may then flow the vapor refrigerant 6 back to the compressor 8 and the cycle may be repeated.

When the ground source system starts, transitions to or is running in water heating mode depicted in FIG. 6 the controller may actively adjust the operating charge in the active refrigerant circuit as described above for the water heating mode of operation using the ACM process. A remove charge valve may be opened by the controller according to an algorithm to relieve excessive discharge pressure, reduce excessive subcooling or increase superheat within the active refrigerant circuit. An add charge management valve may be opened according to the algorithm to reduce excessive superheat or increase low subcooling. The controller seeks to hold discharge pressure below 510 psi, Superheat between 5 F and 20 F and Subcooling between 12 F and 25 F.

Figure 7:
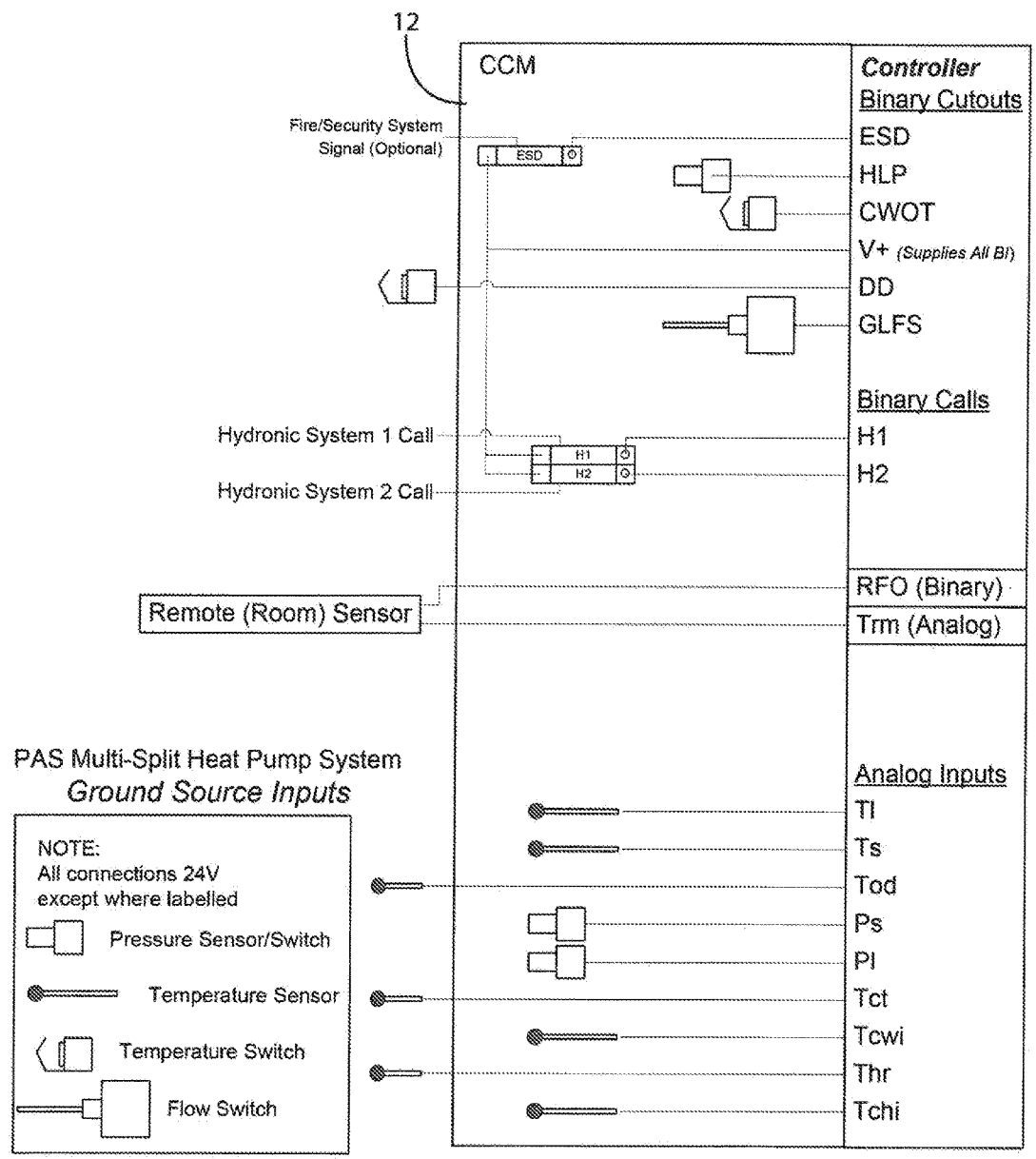
FIG. 7 is a schematic of inputs (sensors and switches) implemented in the Compressor Control Module "CCM" and how they are integrated with relays and the digital controller for a ground source system
Figure 8:
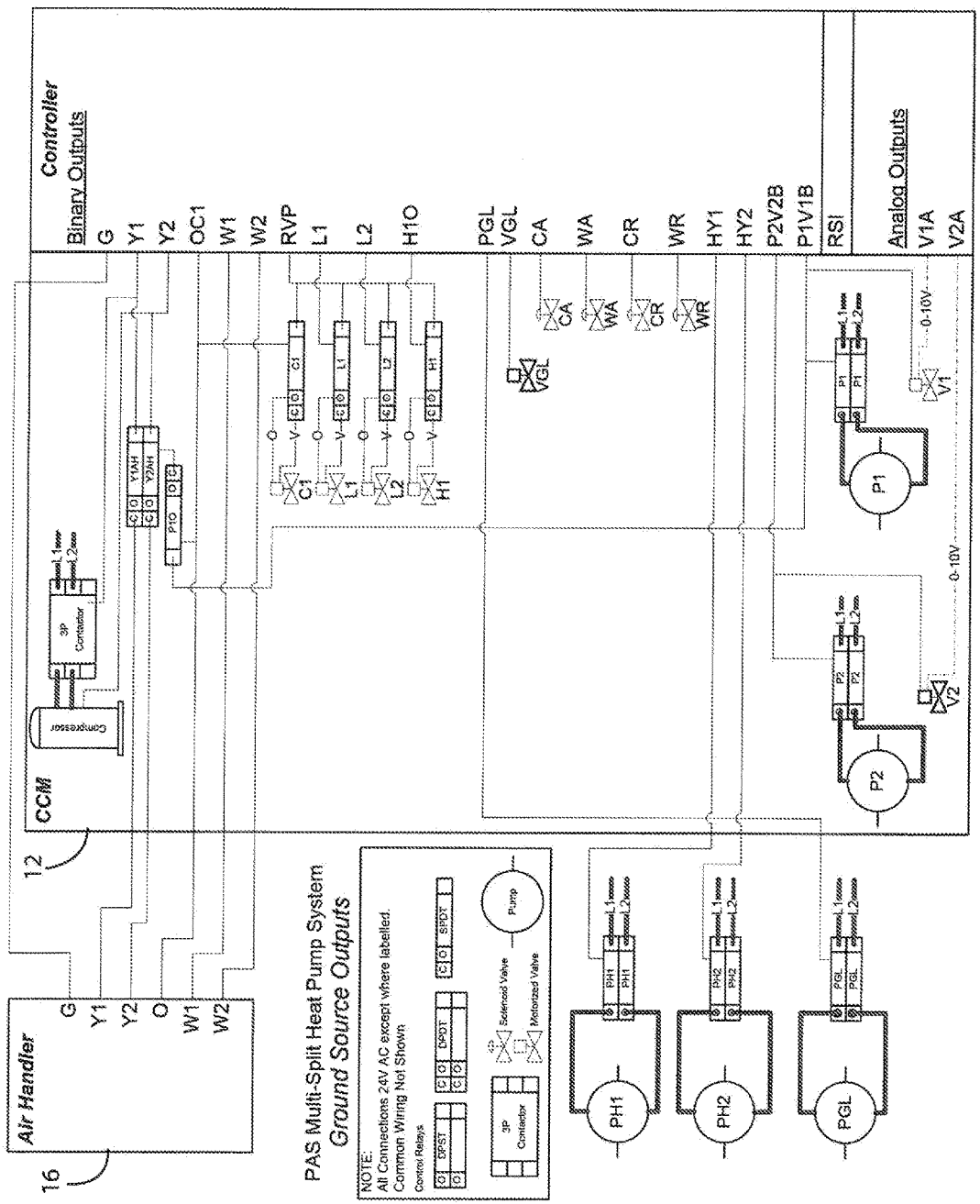
FIG. 8 is a schematic of CCM outputs (relay switches and variable DC voltage control signals) implemented in the CCM and how they are integrated with relays and the controlled components in a ground source system.

FIG. 7 shows the CCM 12 and various inputs and outputs that the CCM 12 may control in a ground source operation. FIG. 8 shows a possible wiring configuration between the heat pump coil 16 and the CCM 12 also in a ground source operation.

Figure 9:
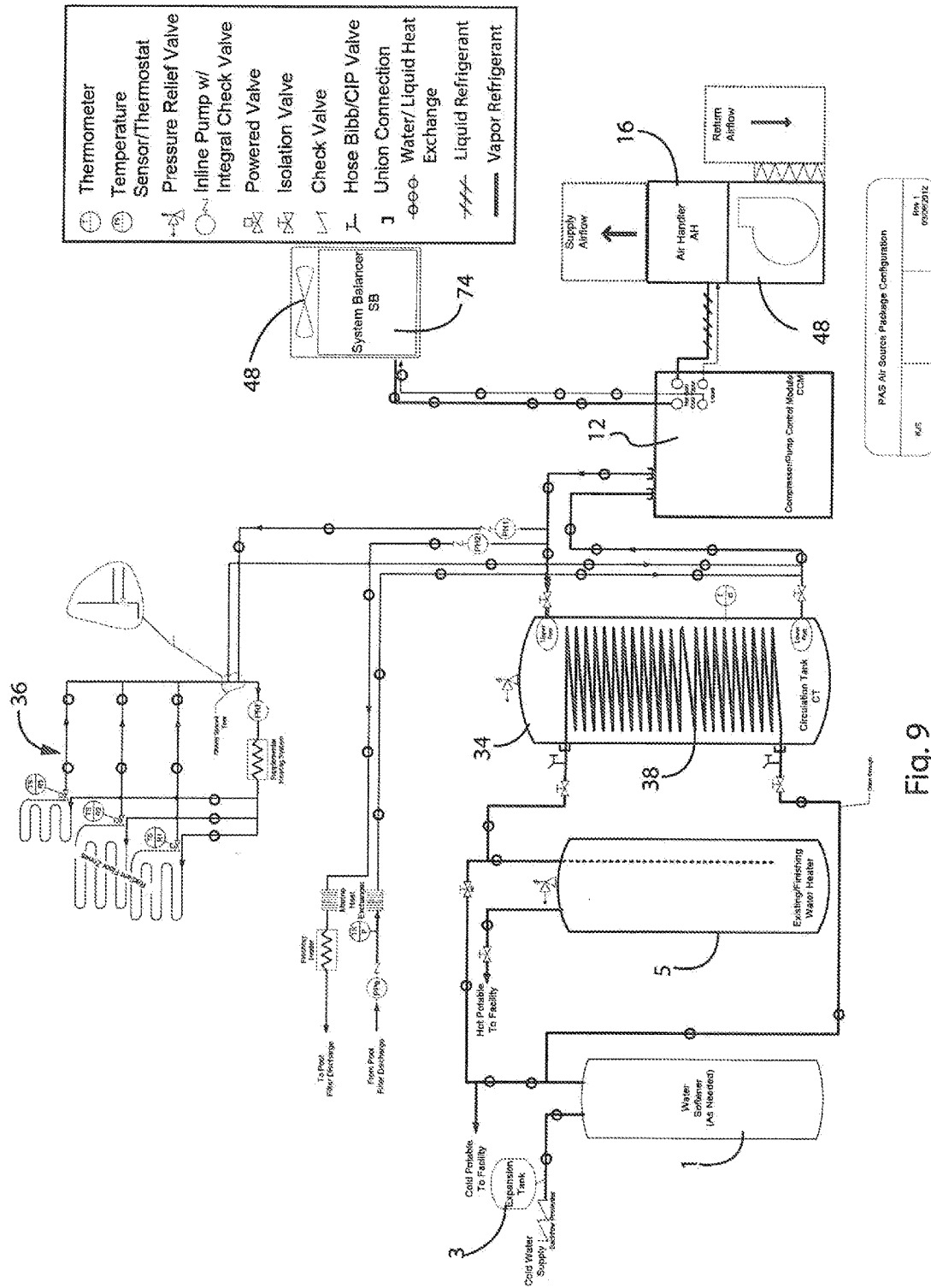
FIG. 9 is a schematic view of an air source system detailing the flow of water and the flow of refrigerant between major mechanical components.
Figure 10:
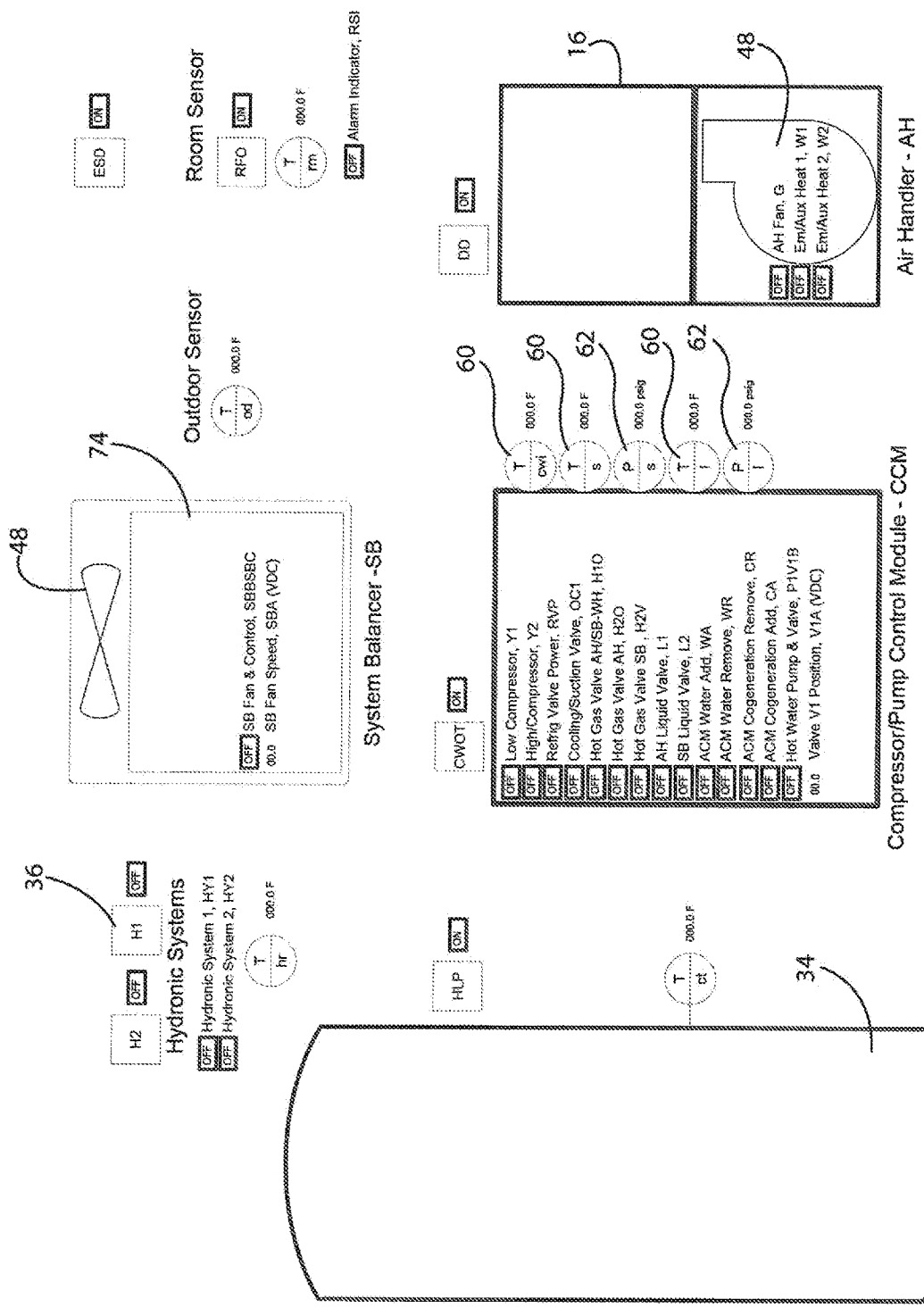
FIG. 10 a representation of the control interface status screen for an air source system that will display the inputs and outputs and provide access to the set point and configuration data entry screens.

FIG. 9 introduces an air source system. The air source system exchanges thermal energy between the ambient air and in interior of the residential or commercial building using a heat pump coil 16 and a second heat pump coil 74. Similar to the ground source operation, water may be supplied from a well or municipal water supply. An expansion tank 3 may accumulate pressurized water. Potable water from the supply that is to be heated may pass through a water softener 1 if needed and then pass into an indirect water heater coil 38 inside of the liquid reservoir 34 where it is preheated. After preheating, the potable water may pass through a water heater 5 which will heat the water to a desired temperature. The indirect water heater 38 exchanges energy through the second heat pump coil 74 with the use of the fan 48. The operation is similar to the ground source operation described with respect to FIG. 1; however, it uses thermal energy in the ambient air instead of thermal energy in the ground. The CCM 12 controls the operation of both the heat pump coil 16 the second heat pump coil 74 and both fans 48. The CCM also controls the flow of water 9 through the system. Thermal energy may be transferred for hydronic water heating 36 or to heat a swimming pool or any other low temperature hydronic heating application FIG. 10 shows an air source control diagram. The CCM 12 is shown with various features that it may control. The CCM 12 may control the function of the hydronic water heating 36, the liquid reservoir 34, the heat pump coil 16 the second heat pump coil 74, and any of the fans 48. The CCM uses inputs from multiple temperature sensors 60 and pressure sensors 62.

Moving on to FIG. 11, the air cooling mode 24 is shown for air source operation. A defrost mode 30 may also be used in the same configuration simply by turning off all fans 48. The defrost mode 30 allows the system to melt ice off of heat pump coil 74. During the air cooling mode 24, the compressor 8 compresses vapor refrigerant 6 and flows it through oil separator 7. Vapor refrigerant 6 may then flow through the valves 11 and through the second heat pump coil 74. The vapor refrigerant 6 is condensed to a liquid refrigerant 4 in the heat pump coil 74 before it flows through expansion valve 18. Refrigerant valves 82 and 22 then pass the liquid refrigerant 4 to the expansion valve 18 where the liquid refrigerant is expanded. The expanded refrigerant is heated to a vapor refrigerant 7 as it passes through the heat pump coil 16 before returning to the accumulator 2. A third refrigerant valve 84 directs the vapor refrigerant 6 to the accumulator 2. The accumulator 2 passes vapor refrigerant 6 to the compressor 8 wherein the cycle may be repeated.

Similar to the multiple modes discussed with respect to the ground source operation, the multiple modes of the air source operation all utilize the same hardware. The CCM 12 controls all the various valves through inputs from multiple temperature sensors 60 and pressure sensors 62 to open and close various circuits of the system. This allows the same hardware to perform the multiple modes.

For example, FIG. 12 shows the cogeneration mode 32 of the air source operation. The compressor 8 flows vapor refrigerant 6 through oil separator 7, where lubricating oil may be separated and drawn back to the compressor 8 through suction line 13. A valve 11 directs the flow of the vapor refrigerant 6 through condenser 10. The condenser 10 exchanges thermal energy between water 9 from the liquid reservoir 34 and the refrigerant. Circulation pump 40 flows the water 9 to a mixing valve 46 that controls the temperature of the water 9. The vapor refrigerant 6 is cooled into a liquid refrigerant 4 and flows through a second refrigerant, valve 82 and through expansion valve 18 where it enters the heat pump coil 16. The refrigerant is changed back into a vapor refrigerant 6 by expansion valve 18 and the heat pump coil 16. A third refrigerant valve 84 controls the flow of the vapor refrigerant 6 to the accumulator 2 through the inlet to the accumulator 58. The vapor refrigerant may then be supplied to the compressor 8 and the cycle repeated.

When the air source system starts, transitions to or is running in cogeneration mode depicted in FIG. 12 the controller may actively adjust the operating charge in the active refrigerant circuit as described above for the cogeneration mode of operation using the ACM process. A remove charge valve may be opened by the controller according to an algorithm to relieve excessive discharge pressure, reduce excessive subcooling or increase superheat within, the active refrigerant circuit. An add charge management valve may be opened according to the algorithm to reduce excessive superheat or increase low subcooling. The controller seeks to hold discharge pressure below 510 psi, Superheat between 5 F and 20 F and Subcooling between 12 F and 25 F.

Moving on to FIG. 13, a forced air heating mode 26 is shown for the air source operation. In this configuration, the compressor 8 compresses vapor refrigerant 6 and flows it through oil separator 7, where the suction line 13 may flow oil back to the compressor 8, and through multiple valves 11. The valves 11 direct the flow of the vapor refrigerant to the heat pump coil 16 where the refrigerant is condensed to a liquid. The vapor refrigerant 6 then flows through expansion valve 18. A second refrigerant valve 82 controls the flow of the liquid refrigerant 4 to the second heat pump coil 74. A check valve 14 prevents the liquid refrigerant 4 from flowing into the condenser 10. Refrigerant valve 22 controls the flow of the liquid refrigerant 4 to expansion valve 18 and into the second heat pump coil 74 where the refrigerant is heated to a vapor. A fan 48 is used to draw air through the second heat pump coil 74. The liquid refrigerant 4 is changed into a vapor refrigerant 6 and directed by a third refrigerant valve 84 to flow to the accumulator 2 through the inlet to the accumulator 58. The vapor refrigerant 6 may then flow back to the compressor 8 and the cycle repeated.

FIG. 14 shows the water heating mode 28 for the air source operation. The compressor 8 compresses vapor refrigerant 6 and passes it to the oil separator 7. A suction line 13 may flow oil back to the compressor 8 for lubrication. The flow of vapor refrigerant 6 is directed by a valve 11 to flow through condenser 10. The condenser 10 exchanges thermal energy between water 9 from the circulation tank 34 and the refrigerant. Circulation pump 40 circulates the flow of water while a mixing valve 46 controls the temperature of the water 9. The vapor refrigerant 6 is changed into a liquid refrigerant 4 and flows through check valve 14 and is directed by refrigerant valve 22 to flow through expansion valve 18 and into the second heat pump coil 74. The liquid refrigerant 4 is then changed into a vapor refrigerant 6 by expansion valve 18 and second heat pump coil and is directed by a third refrigerant valve 84 to flow to the accumulator 2. The accumulator 2 supplies vapor refrigerant 6 to the compressor 8 and the cycle may be repeated.

When the air source system starts, transitions to or is running in water heating mode depicted in FIG. 6 the controller may actively adjust the operating charge in the active refrigerant circuit as described above for the water heating mode of operation using the ACM process. A remove charge valve may be opened by the controller according to an algorithm to relieve excessive discharge pressure, reduce excessive subcooling or increase superheat within the active refrigerant circuit. The add charge management valve may be opened according to the algorithm to reduce excessive superheat or increase low subcooling. The controller seeks to hold discharge pressure below 510 psi, Superheat between SF and 20 F and Subcooling between 12 F and 2 SF.

Figure 15:
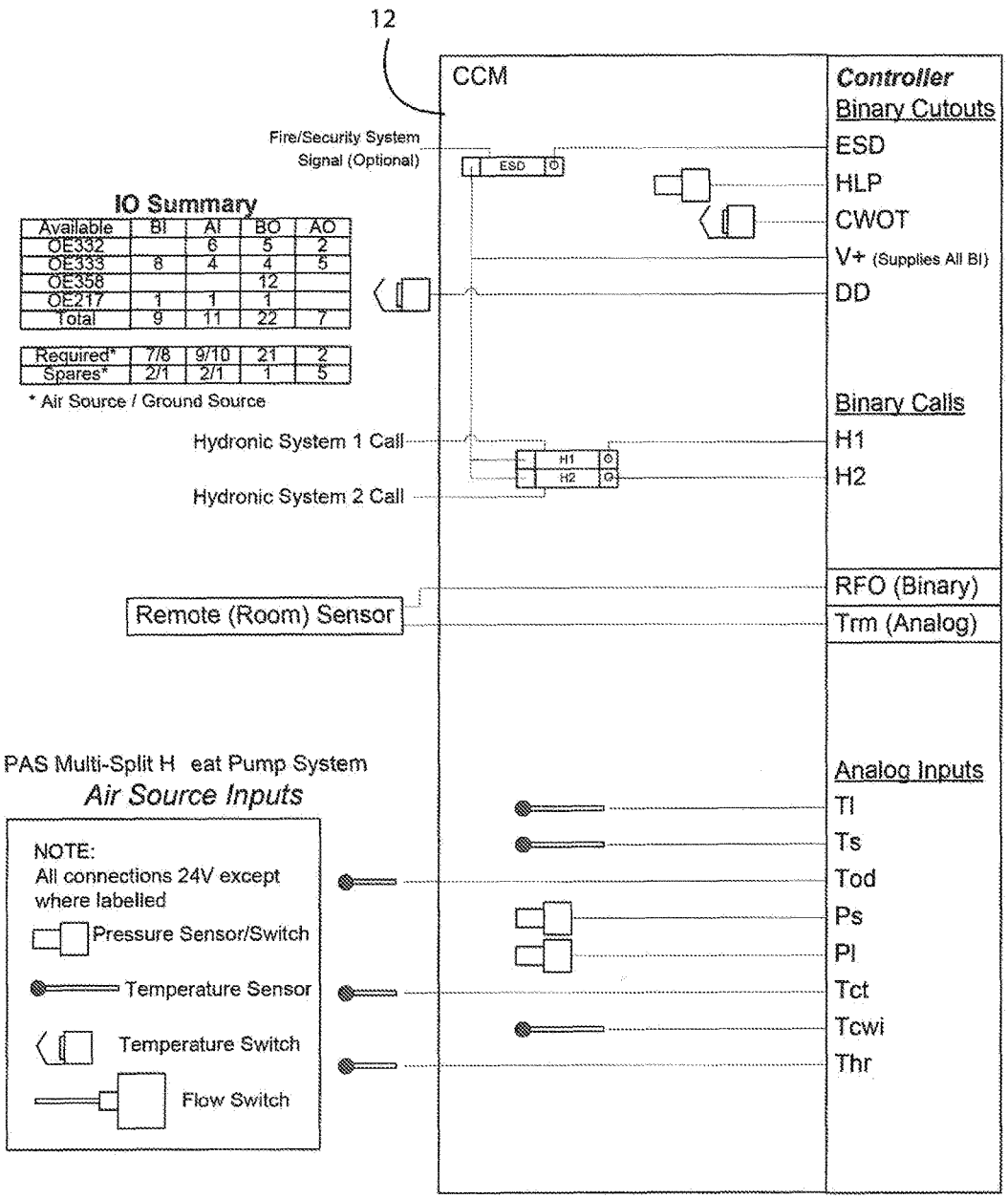
FIG. 15 is a schematic of the inputs (sensors and switches) implemented in the CCM and how they are integrated with relays and the digital controller for an air source system.
Figure 16:
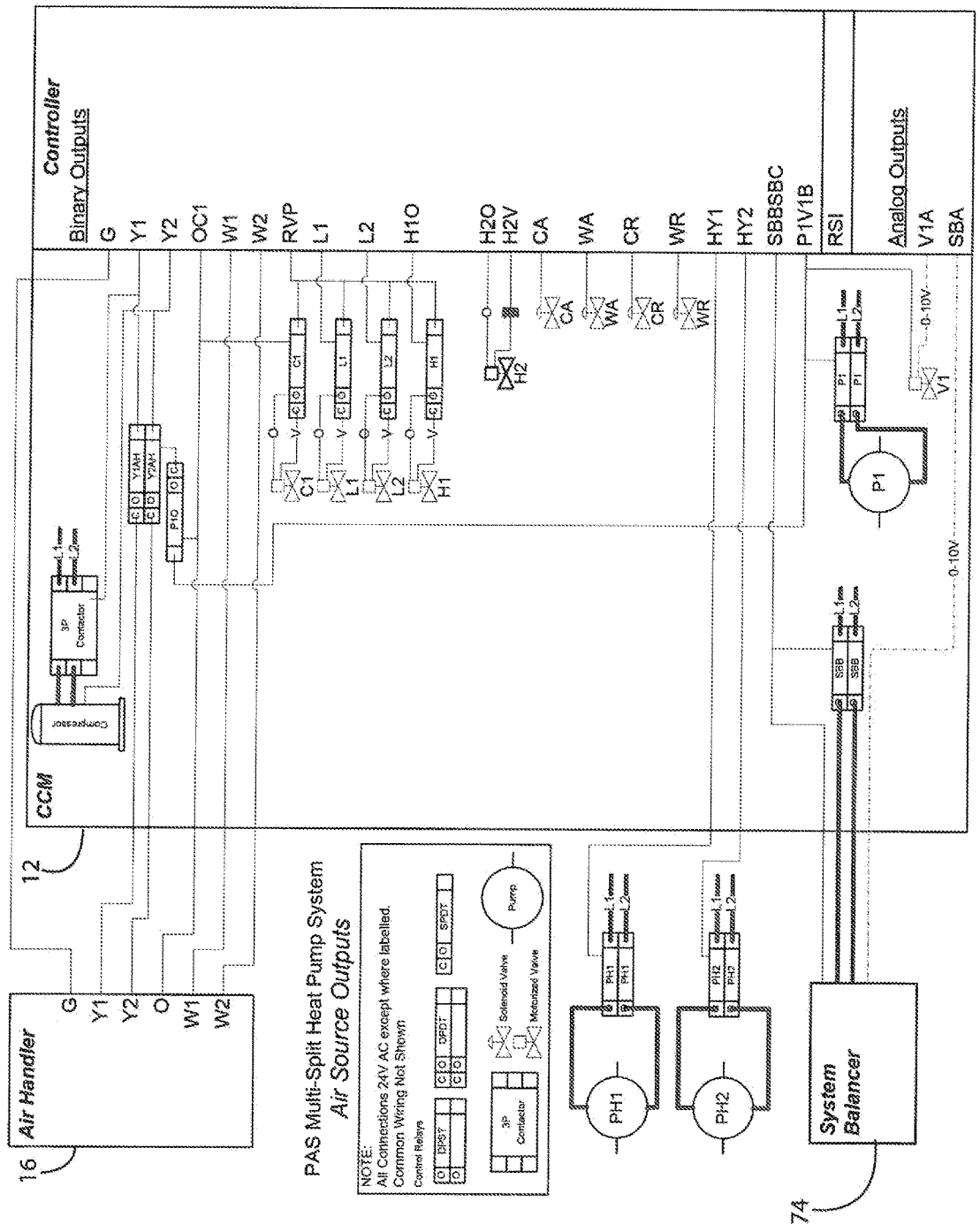
FIG. 16 is a schematic of the CCM outputs (relay switches and variable DC voltage control signals) implemented in the CCM and how they are integrated with relays and the controlled components in an air source system.

Transitioning now to FIG. 15, the CCM 12 is shown configured for air source operation. Various inputs and outputs are shown. FIG. 16 shows the CCM 12 and possible wiring configuration for the heat pump coil 16 and the second heat pump coil 74.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

It is intended that the appended claims cover all such additions, modifications and rearrangements. Expedient embodiments of the present invention are differentiated by the appended claims.

What is claimed is:

1. A system for controlling a multi-circuit heat pump comprising:
    an accumulator configured to accumulate a liquid refrigerant and pass a vapor refrigerant;
    a compressor operably coupled to the accumulator and configured to compress the vapor refrigerant;
    a condenser configured to receive the vapor refrigerant and condense the vapor refrigerant to liquid refrigerant;
    a check valve configured to receive the liquid refrigerant from the condenser and configured to prohibit a flow of liquid refrigerant backwards through the condenser;
    at least one heat pump coil configured to receive the vapor refrigerant and condense the vapor refrigerant into liquid refrigerant or to receive the liquid refrigerant and evaporate the liquid refrigerant into vapor refrigerant;
    at least one expansion valve fluidly coupled with the at least one heat pump coil configured to bypass the liquid refrigerant when the at least one heat pump coil is condensing, and the at least one expansion valve configured to expand the liquid refrigerant to a liquid and vapor mixture when the at least one heat pump coil is evaporating;
    a first plurality of refrigerant valves fluidly coupled to the compressor, the accumulator, the condenser, the at least one heat pump coil, and the at least one expansion valve;
    a controller programmed to control an air cooling mode, an air heating mode, a water heating mode, a defrost mode, and a cogeneration mode that includes simultaneous air cooling and water heating modes;
    a liquid energy exchange source for the at least one heat pump coil;
    an evaporator configured to receive the liquid refrigerant and evaporate the liquid refrigerant into vapor refrigerant;
    a second expansion valve coupled with the evaporator configured to expand the liquid refrigerant into a liquid and vapor mixture before the liquid refrigerant enters the evaporator;
    a second plurality of refrigerant valves fluidly coupling the compressor, the accumulator, the condenser, the at least one heat pump coil, the at least one expansion valve, the second expansion valve, and the evaporator;
    a first bypass connection between the liquid refrigerant discharge of the evaporator and a first mixing valve, the first mixing valve configured to control a temperature of a liquid entering the evaporator by recirculating a cooled liquid through the evaporator; and
    a system for balancing a refrigerant charge comprising:
    a first refrigerant valve in fluid communication with a liquid refrigerant side of the at least one heat pump coil and an inlet to the accumulator;
    a second refrigerant valve in fluid communication with a liquid refrigerant side of the evaporator and the inlet to the accumulator;
    a third refrigerant valve in fluid communication with a vapor refrigerant side of the at least one heat pump coil; and a fourth refrigerant valve in fluid communication with a vapor refrigerant side of the evaporator;

wherein one of a liquid reservoir configured to supply a hydronic heating water for the water heating mode and an indirect water heater for the water heating mode;

a circulation pump configured to pump the hydronic heating water fluidly coupled to one of the liquid reservoir and the indirect water heater to the condenser; and a second bypass connection between a liquid discharge of the condenser and a second mixing valve configured to control a temperature of the liquid refrigerant entering the condenser by recirculating a heated hydronic heating water through the circulation pump.

2. The system for controlling a multi-circuit heat pump of claim 1, further comprising a fan operably coupled to the at least one heat pump coil and configured to flow air across the at least one heat pump coil.

3. The system for controlling a multi-circuit heat pump of claim 1, further comprising a variable speed fan configured to flow air across the at least one heat pump coil resulting in heat being rejected during the air cooling mode and heat being collected during the air and water heating modes.

4. The system for controlling a multi-circuit heat pump of claim 1, further comprising,
a plurality of temperature and pressure sensors operably coupled to the liquid and vapor refrigerant in communication with the controller; and
a variable speed fan coupled to the at least one heat pump coil and operably controlled by the controller with an input from the plurality of temperature and pressure sensors.

5. The system for controlling a multi-circuit heat pump of claim 1, further including an ambient air energy exchange source for the at least one heat pump coil.

6. The system for controlling a multi-circuit heat pump of claim 1, further comprising a diverting valve in communication with the controller and configured to place either a ground source energy exchange source or a liquid reservoir in fluid communication with the condenser.

7. The system for controlling a multi-circuit heat pump of claim 1, further comprising a first heat pump coil and a second heat pump coil;
wherein the second heat pump coil is fluidly coupled to the first heat pump coil and the condenser.

8. The system for controlling a multi-circuit heat pump of claim 1, further comprising a liquid heat source fluidly coupled to the condenser and the evaporator.

9. The system for controlling a multi-circuit heat pump of claim 1, wherein the controller is programmed to transition between the air cooling mode and the cogeneration mode while continuously operating the compressor.

10. The system for controlling a multi-circuit heat pump of claim 1, wherein the controller is programmed to transition between the cogeneration mode and the water heating mode while continuously operating the compressor.

11. The system for controlling a multi-circuit heat pump of claim 1, wherein the controller is programmed to transition between the air heating mode and the water heating mode while continuously operating the compressor.

12. The system for controlling a multi-circuit heat pump of claim 1, wherein the controller is programmed to make a water heating call based on water heating demand while continuously operating the compressor.

13. The system for controlling a multi-circuit heating pump of claim 1, wherein the controller is programmed to make a cogeneration call based on simultaneous water heating and cooling demands while continuously operating the compressor.

14. The system for controlling a multi-circuit heat pump of claim 1, wherein the at least one heat pump coil functions as at least one of a condenser and an evaporator.

15. The system for controlling a multi-circuit heat pump of claim 1, wherein the evaporator is a second heat pump coil.

16. The system for controlling a multi-circuit heat pump of claim 1, wherein the evaporator is exchanged for a second heat pump coil.

* * * * *